Aug. 7, 1951   C. KLINGENS ET AL   2,563,120
SLICING MACHINE
Filed May 14, 1947   16 Sheets-Sheet 7
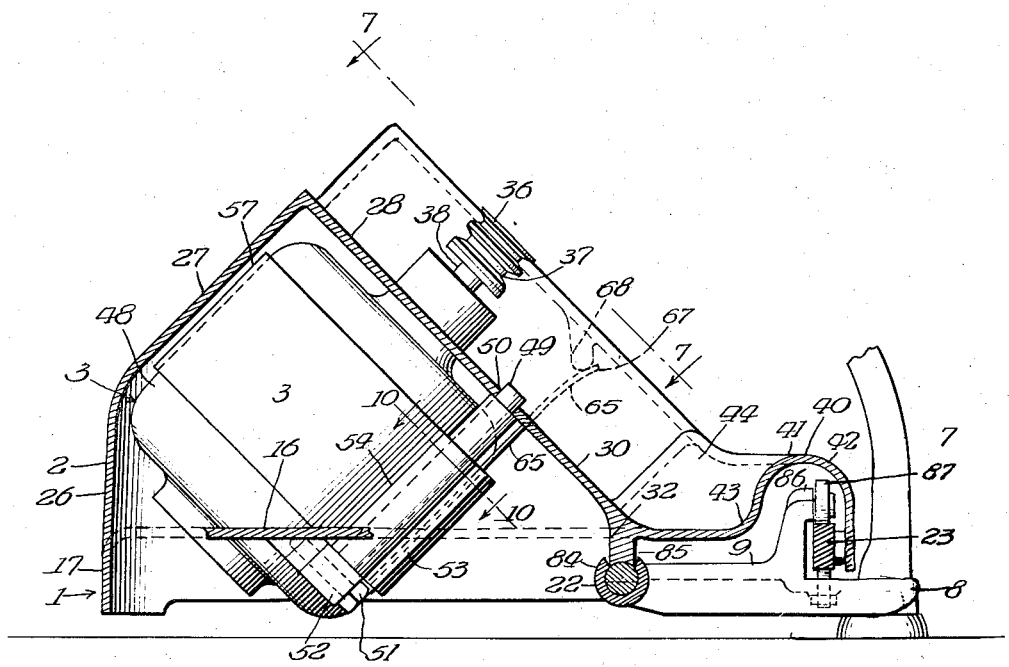
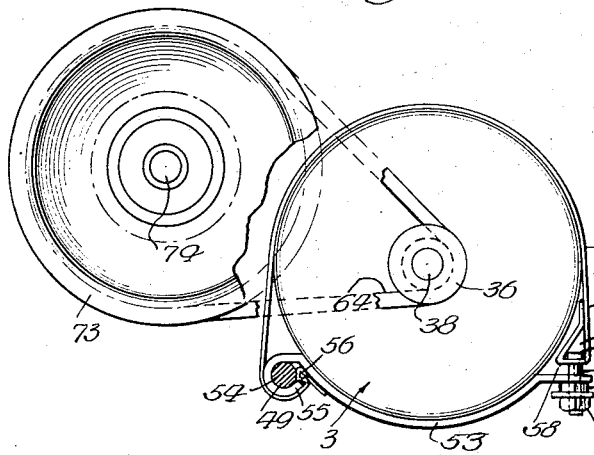
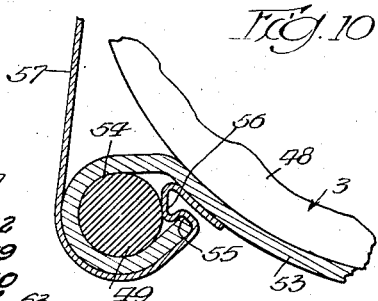
Inventors
Cornelis Klingens
& James Leslie Foster
By:- Spencer, Marzall, Johnston & Cook,
Attys.

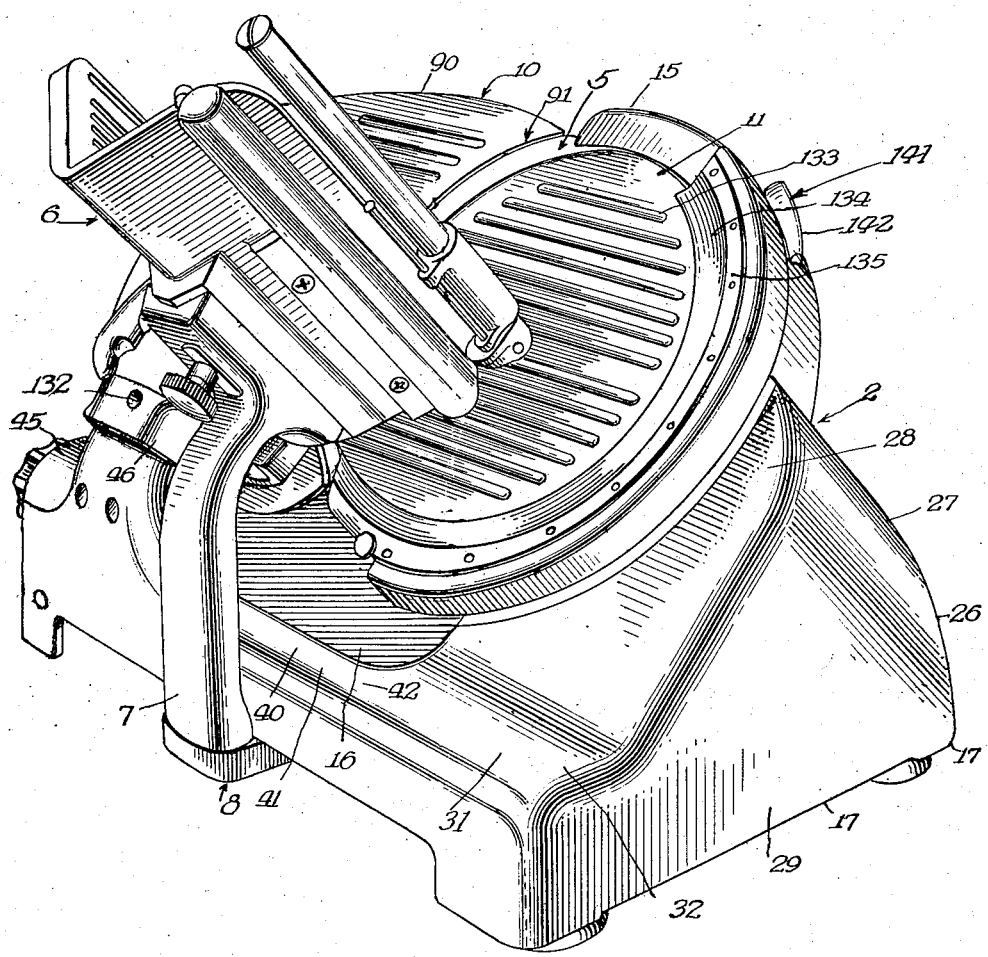

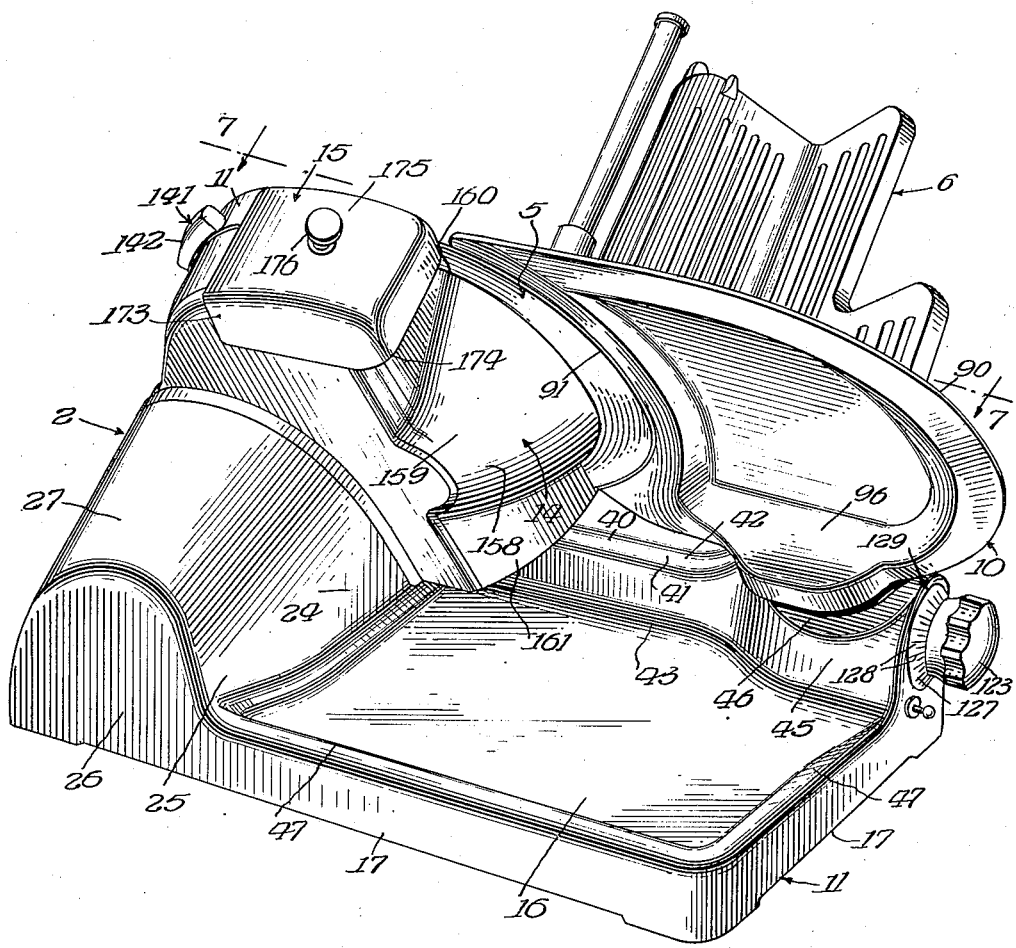

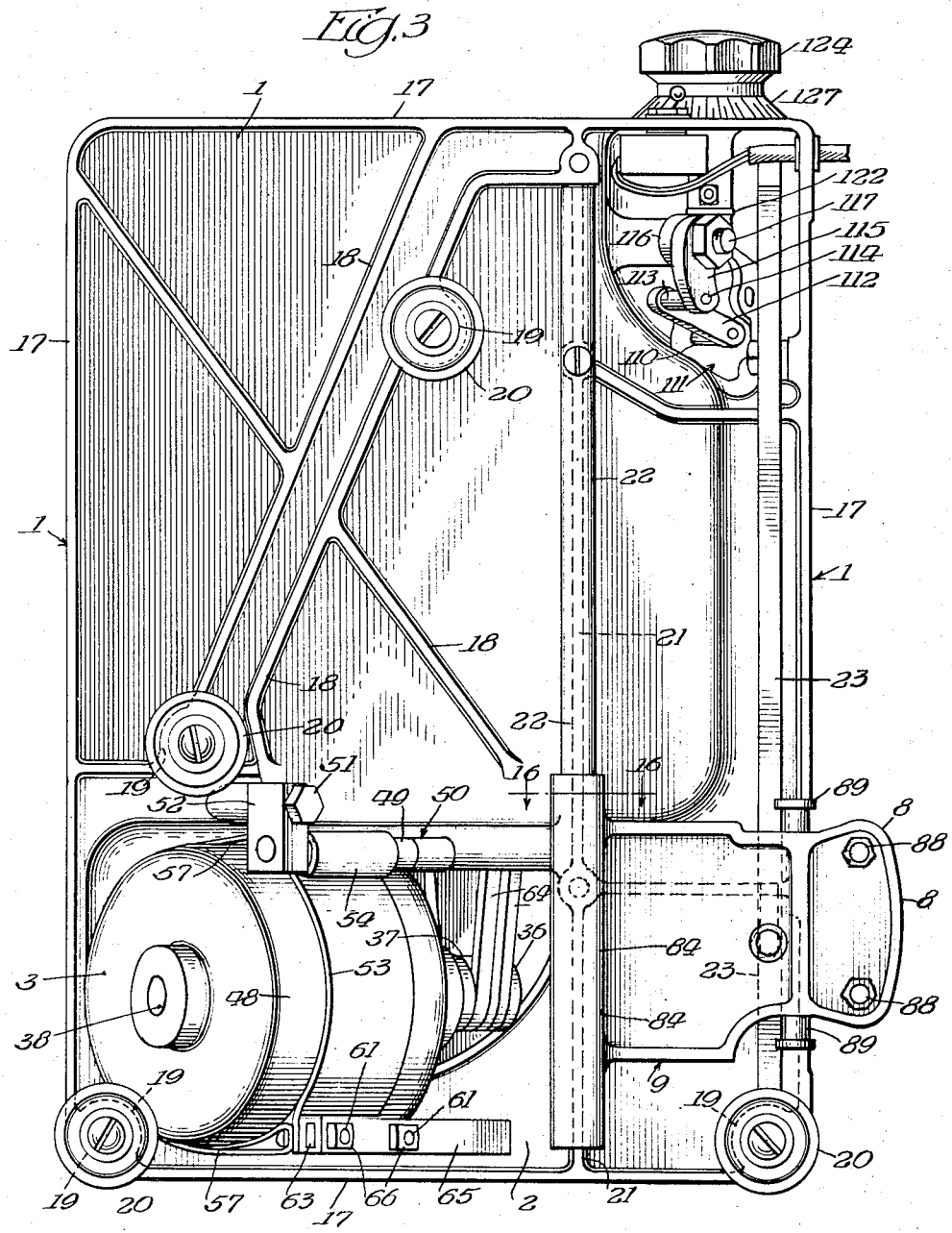

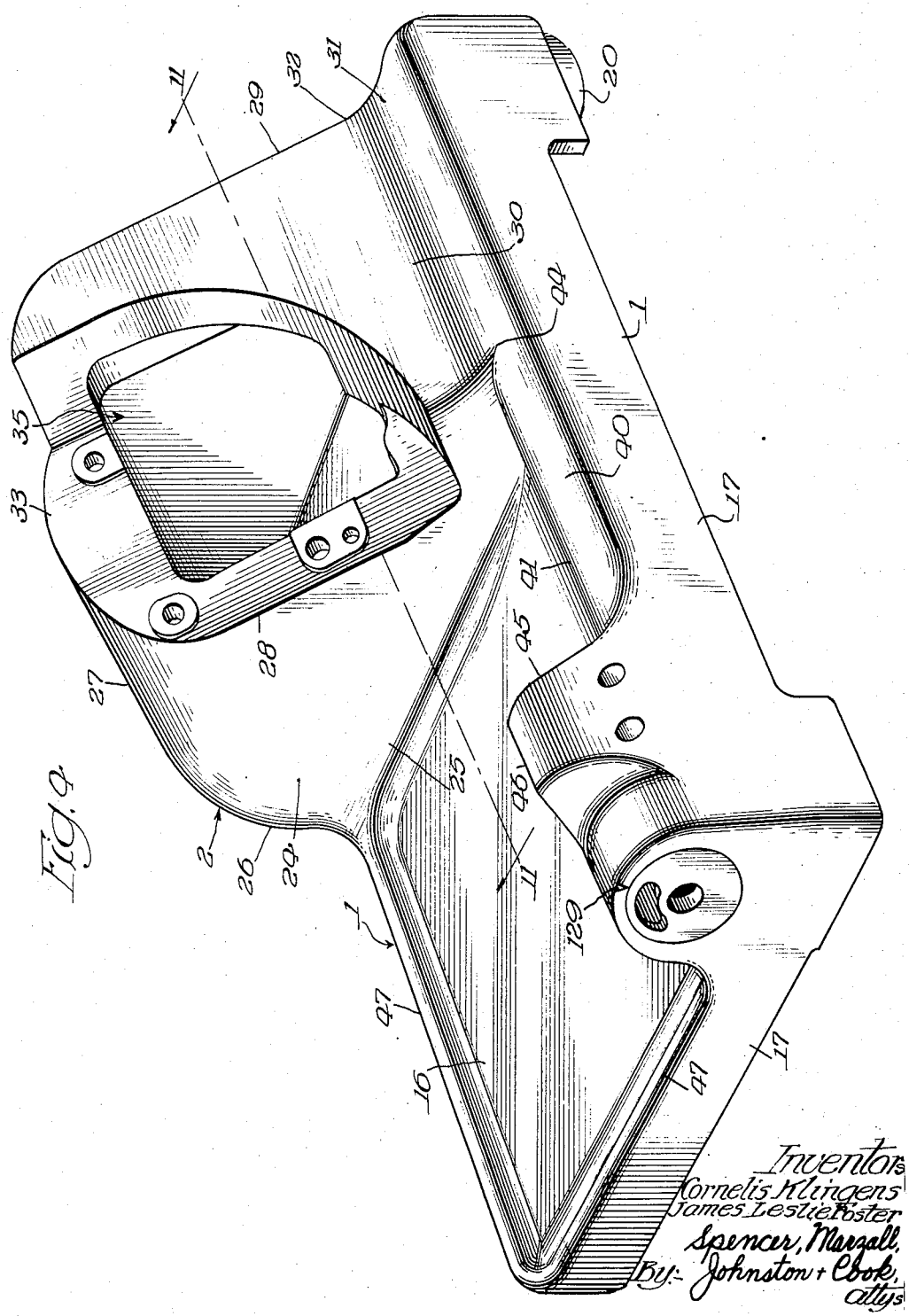

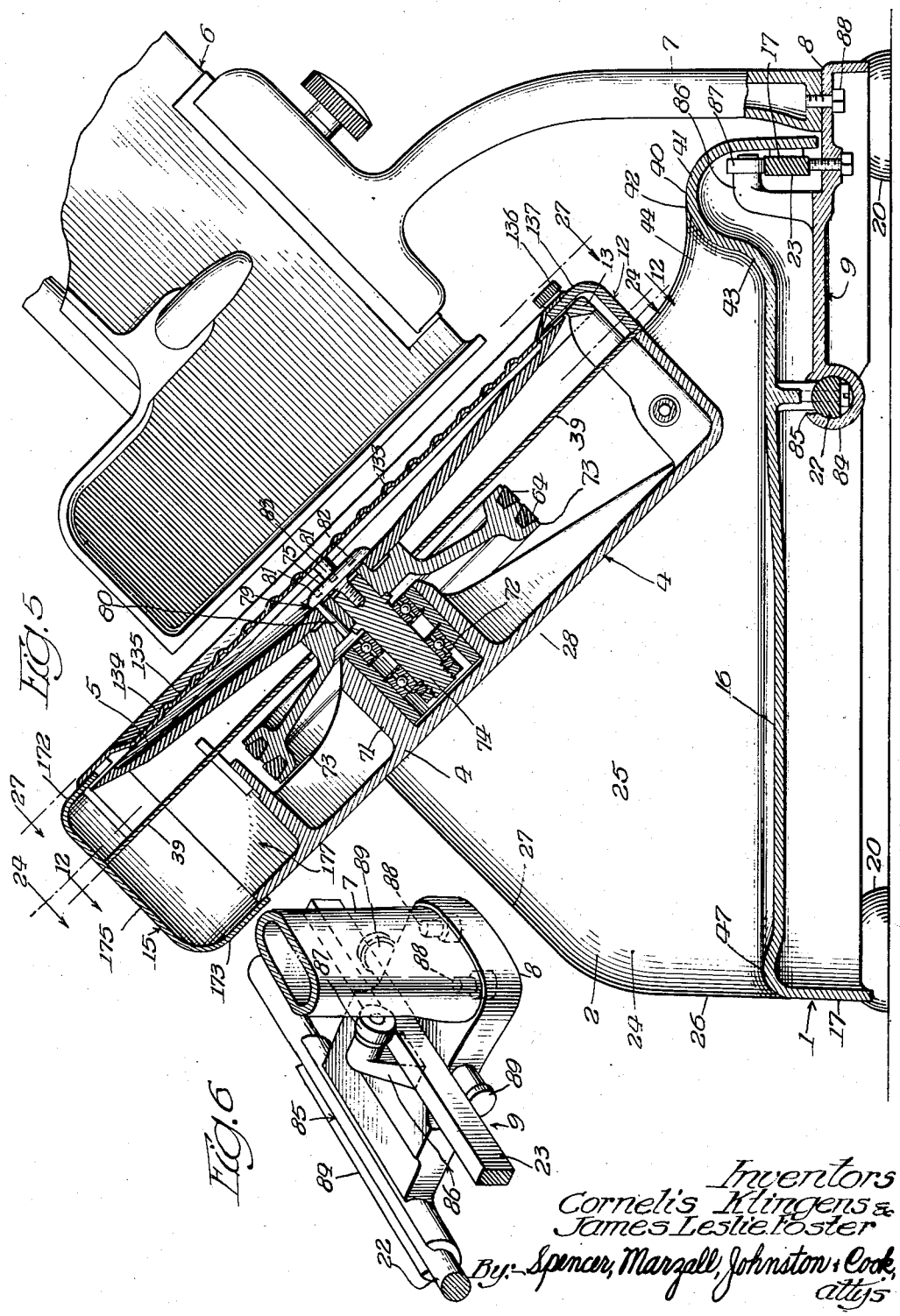

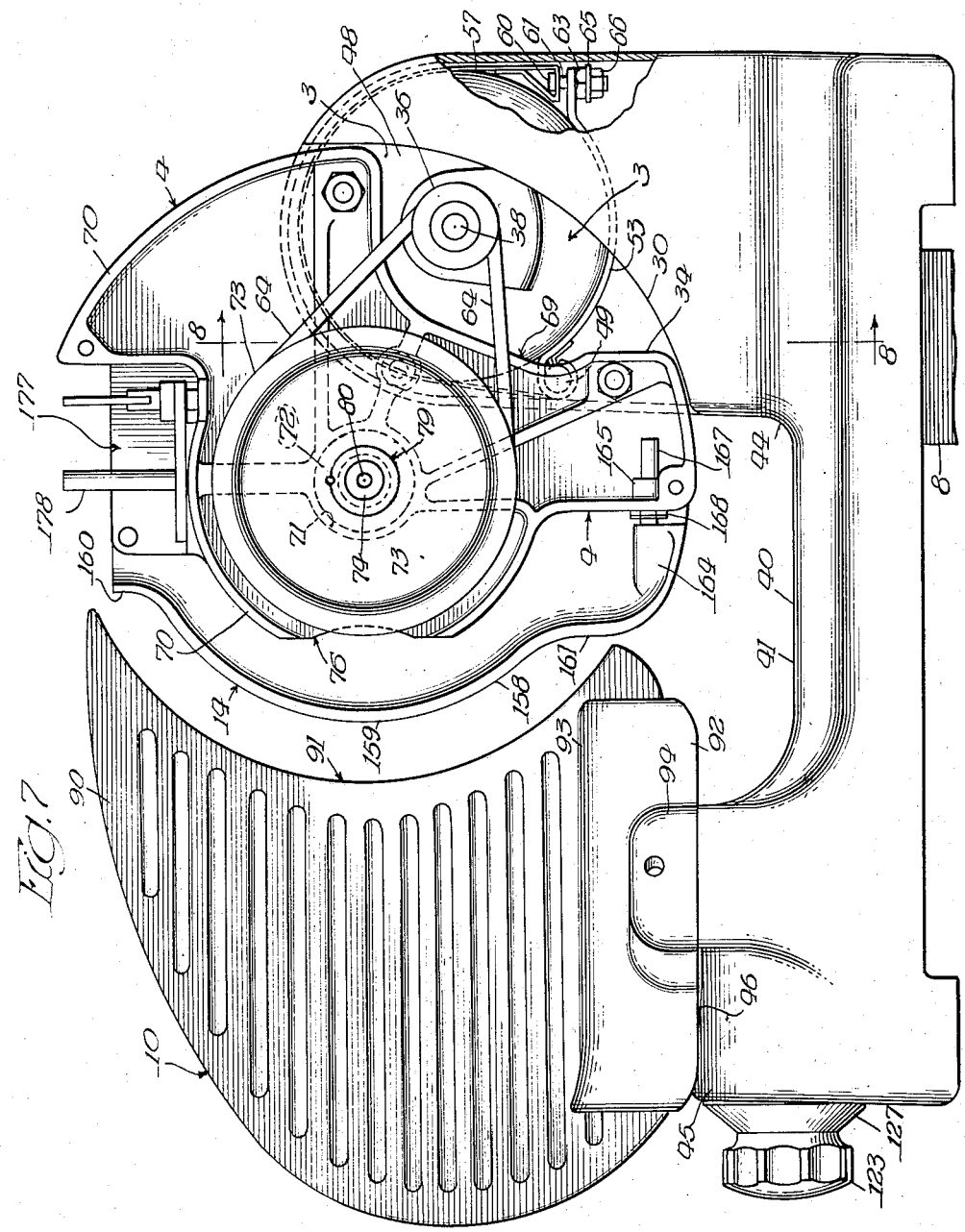

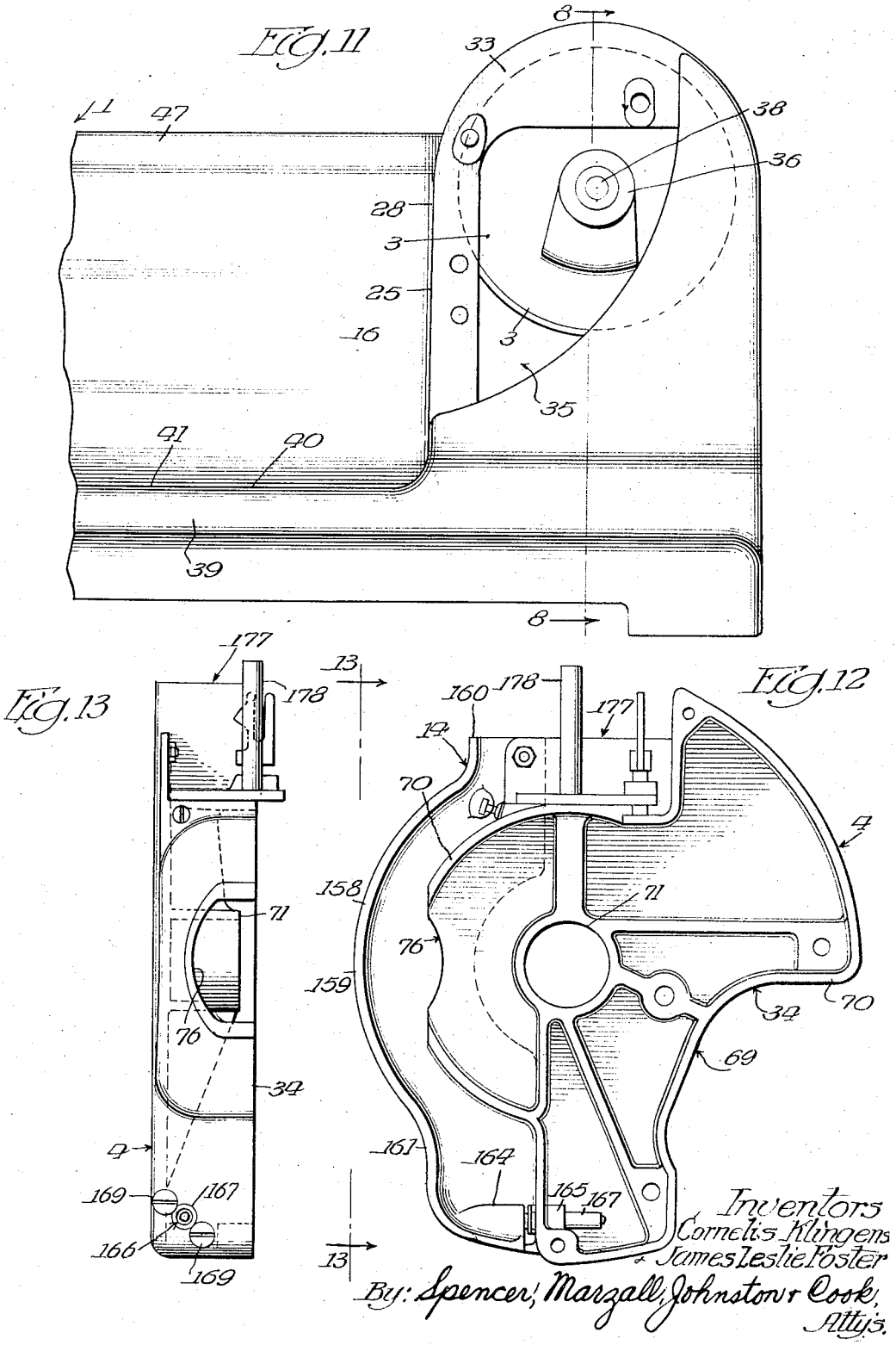

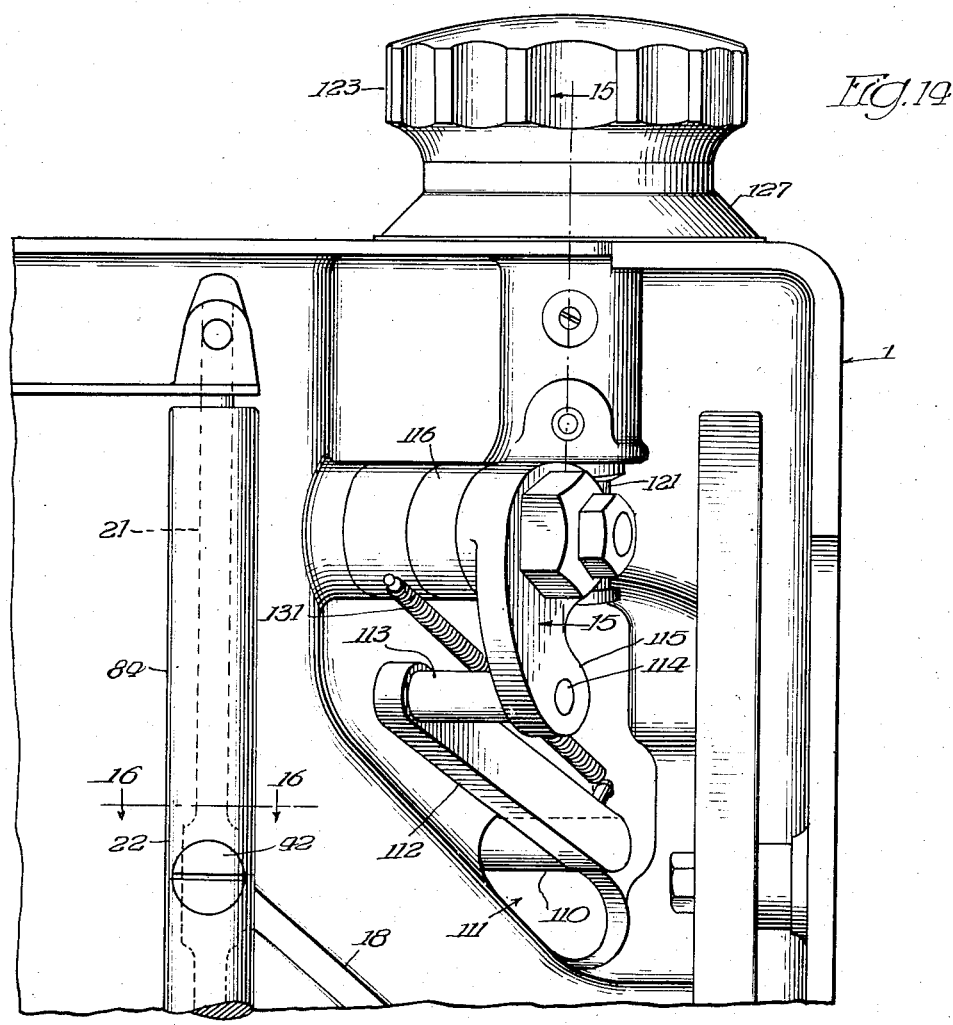
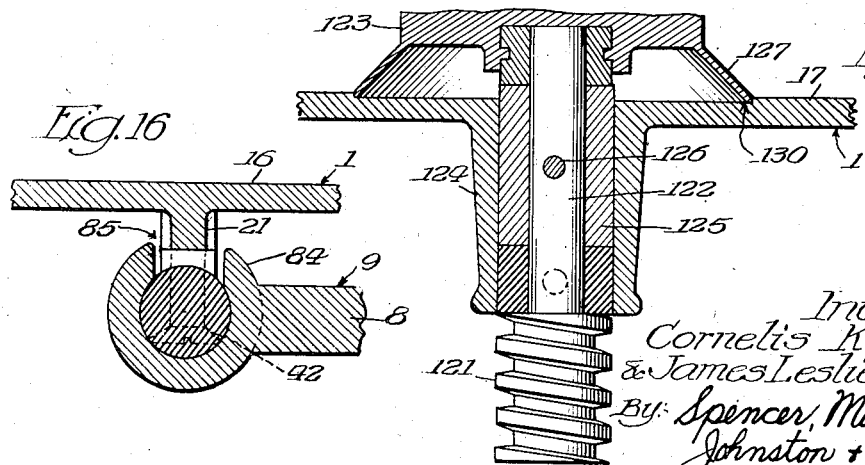

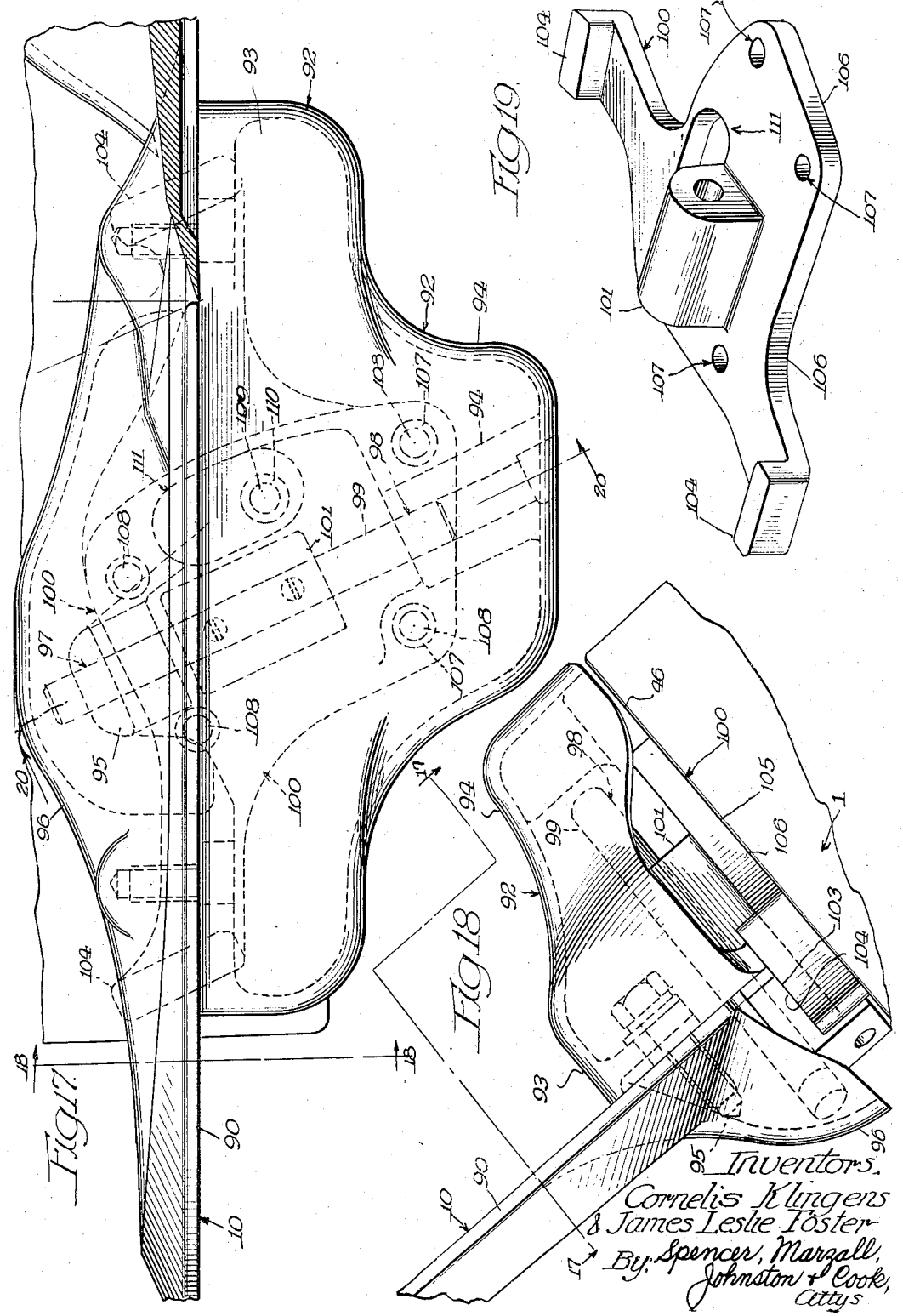

Aug. 7, 1951  C. KLINGENS ET AL  2,563,120
SLICING MACHINE
Filed May 14, 1947  16 Sheets-Sheet 11
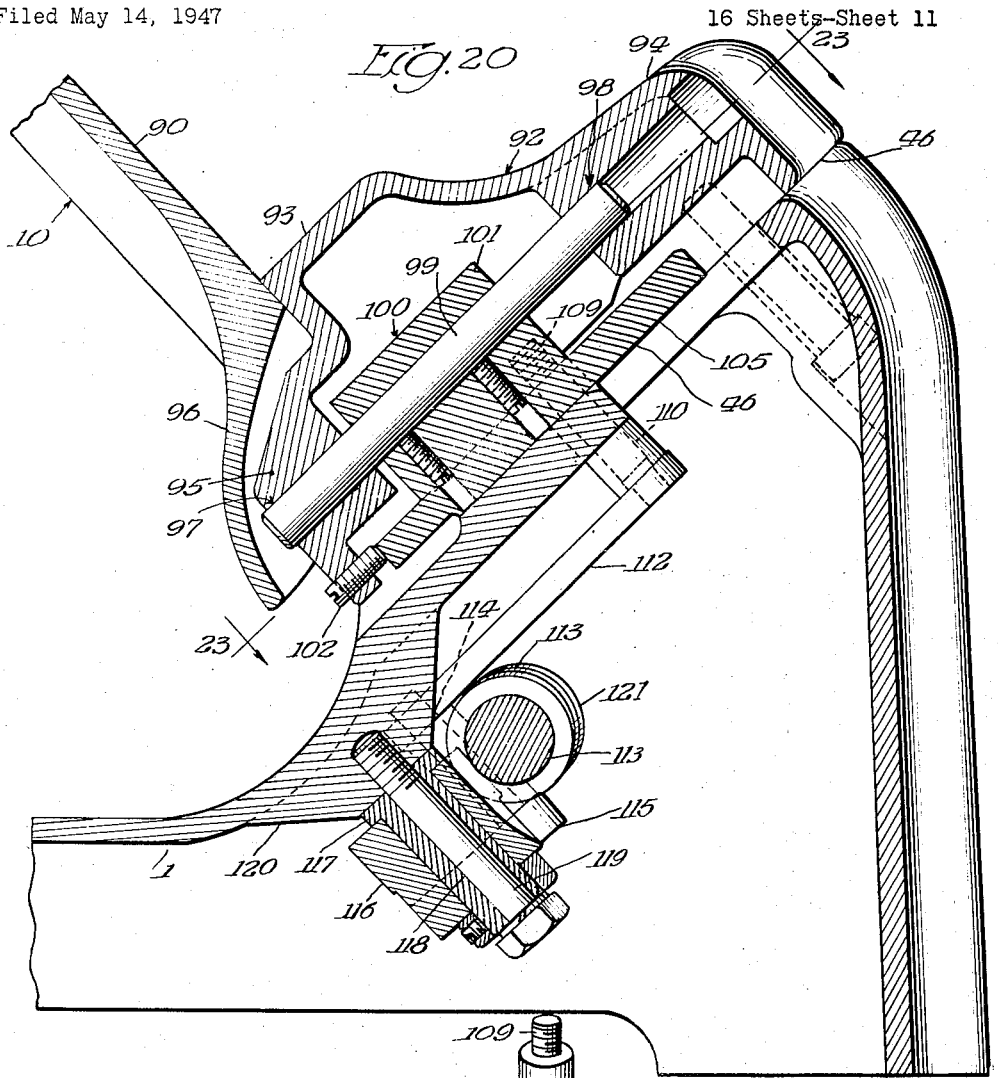
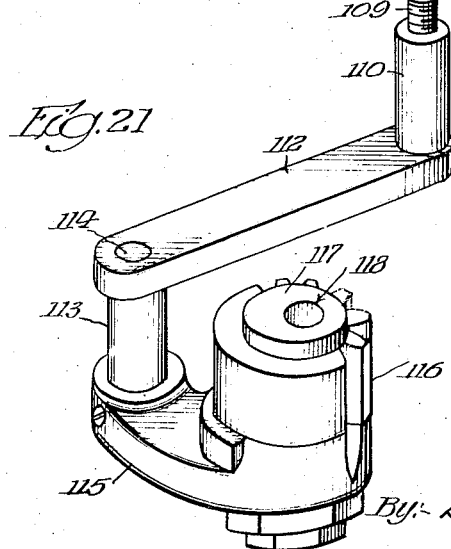
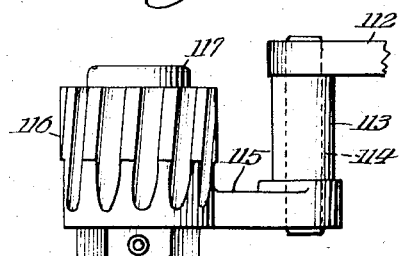
Inventors
Cornelis Klingens
James Leslie Foster
By: Spencer, Marzall, Johnston & Cook, Attys

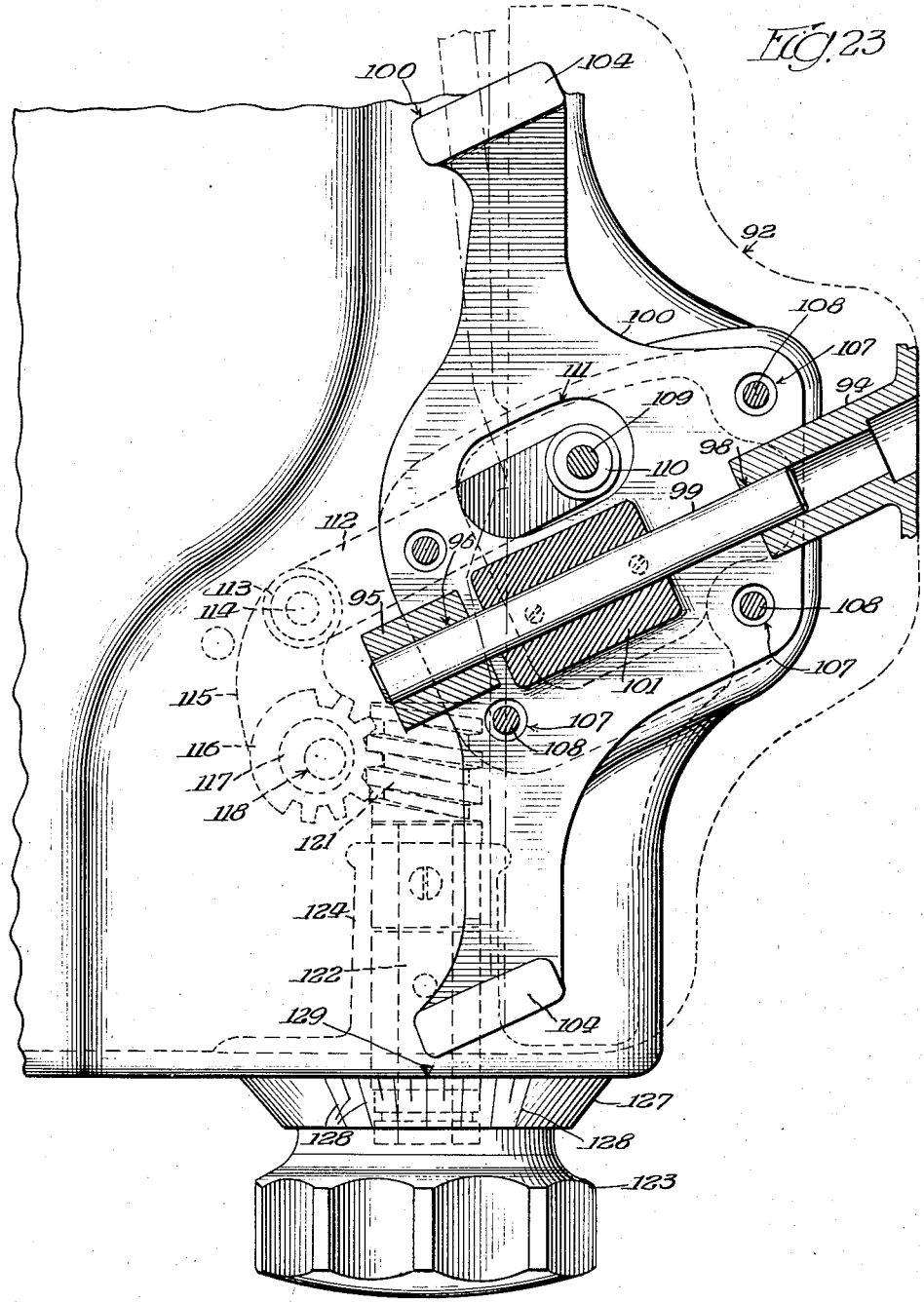

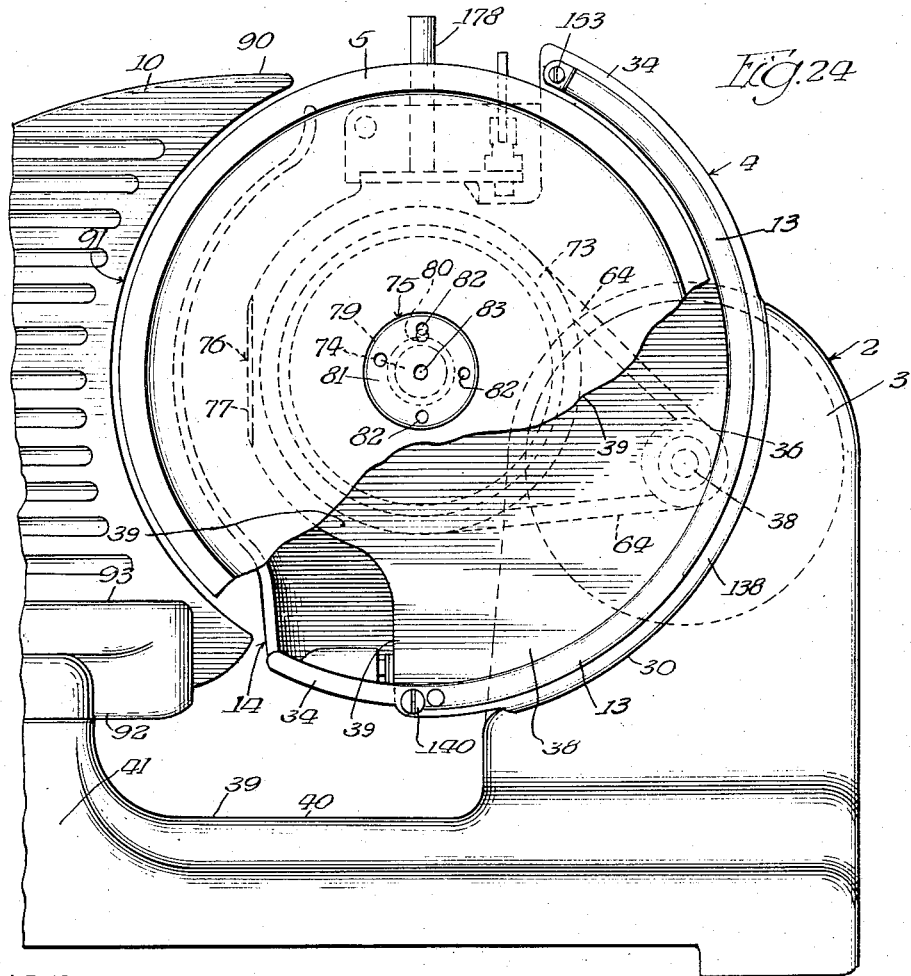
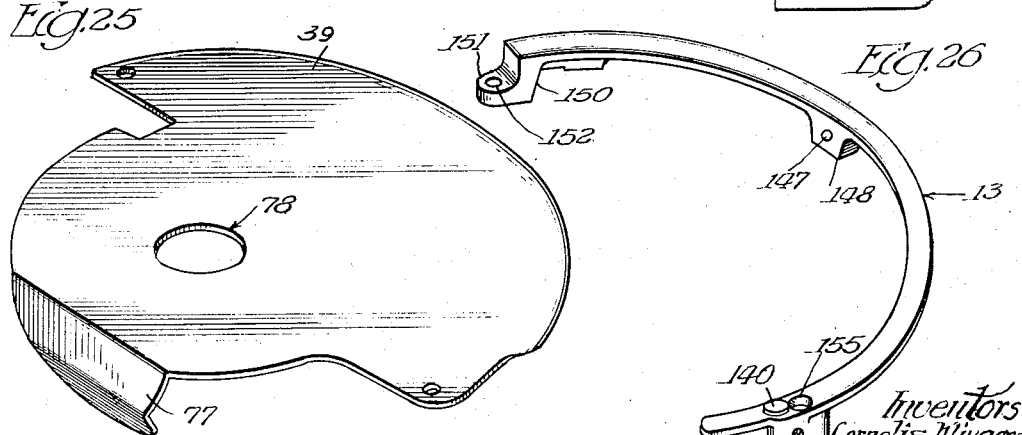

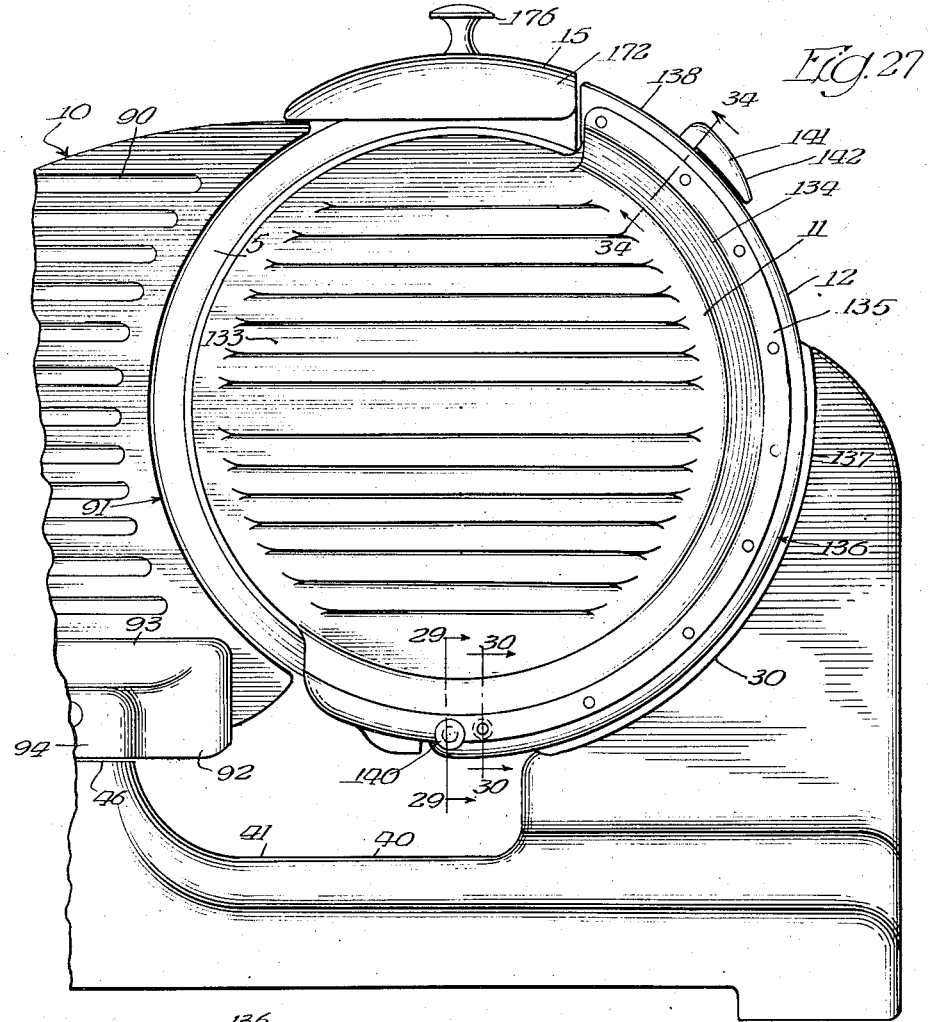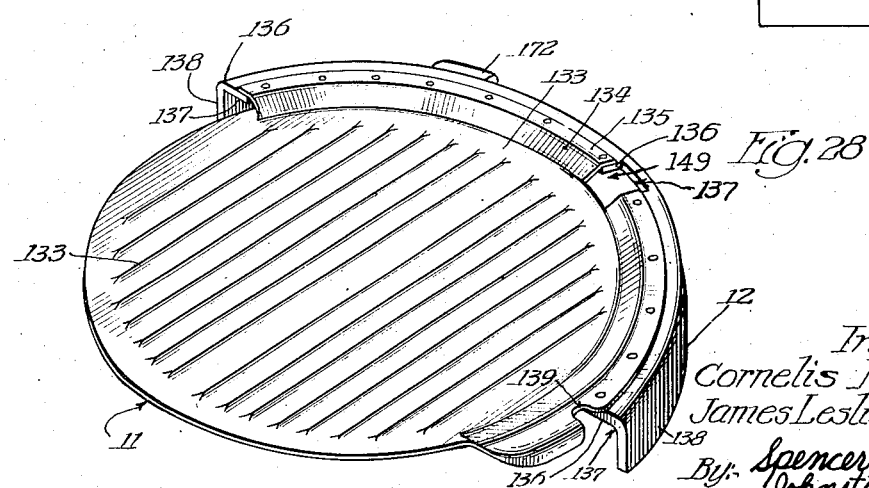

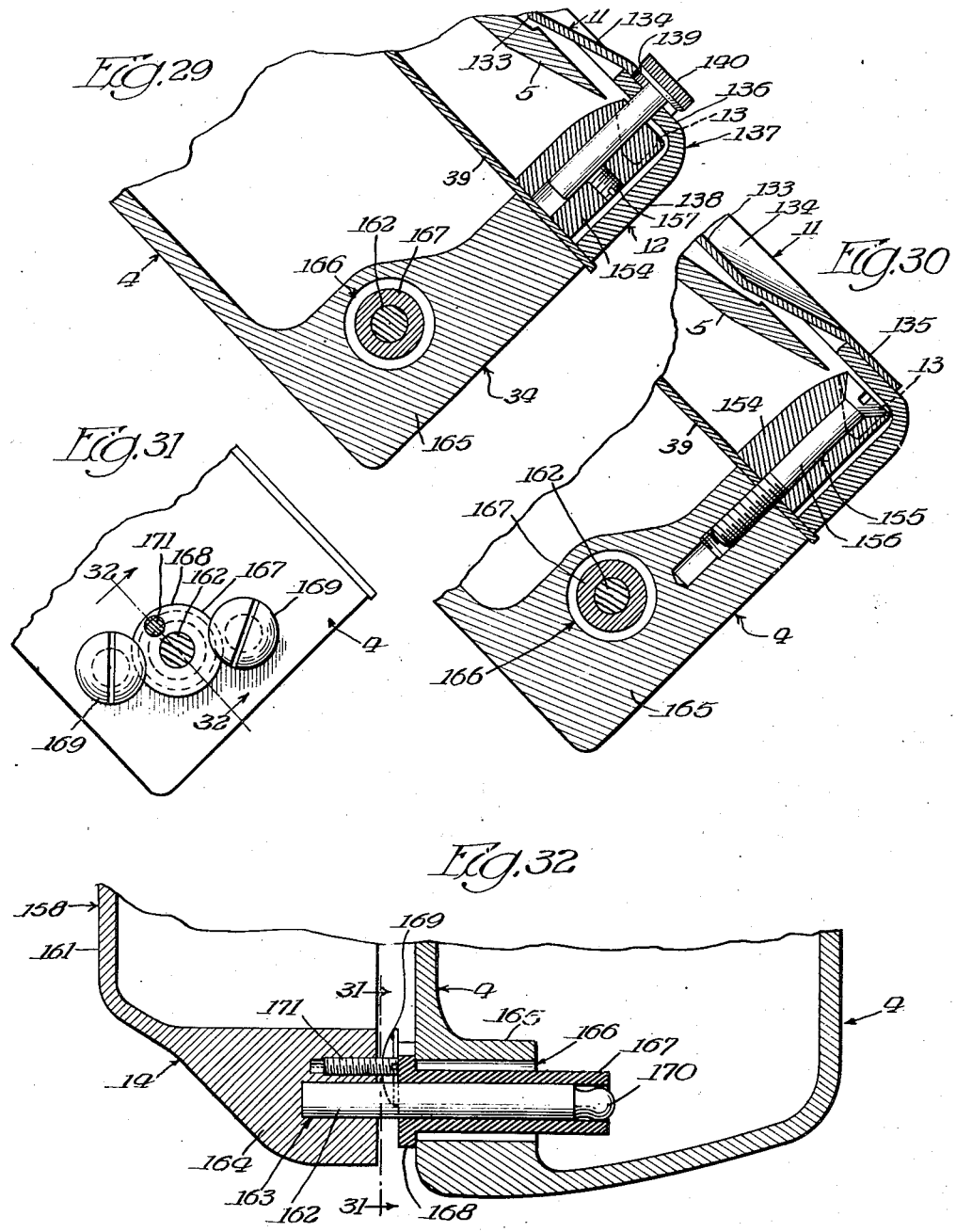

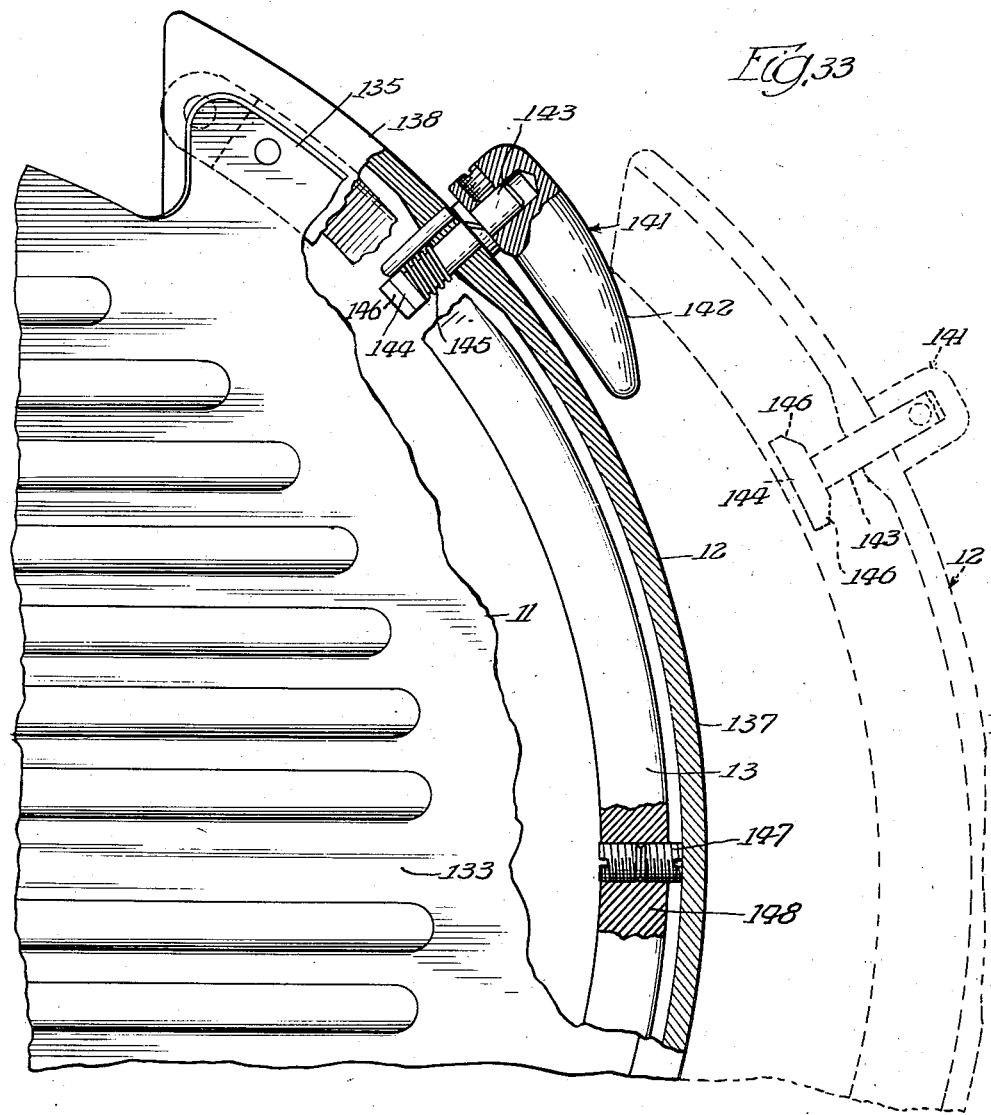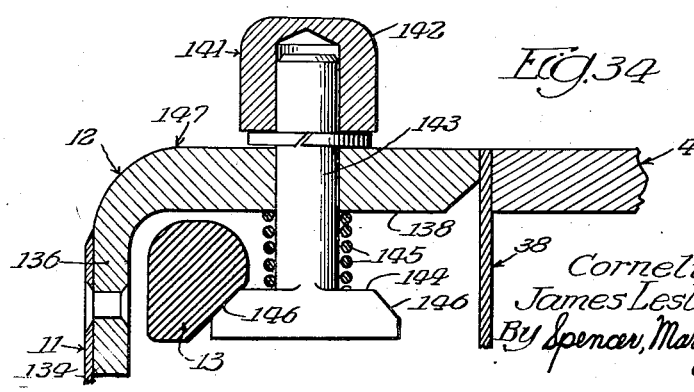

Patented Aug. 7, 1951

2,563,120

UNITED STATES PATENT OFFICE 2,563,120

SLICING MACHINE

Cornelis Klingens, Barendrecht, Netherlands, and James Leslie Foster, La Porte, Ind., assignors to U. S. Slicing Machine Company, Inc., a corporation of Indiana Application May 14, 1947, Serial No. 747,994

10 Claims. (Cl. 146—102)

This invention relates to slicing machines in general for slicing materials, and more particularly to a substance slicing machine whereby there is provided a manually reciprocal food table, preferably in the form of a V-shaped trough, whereby slices are cut as the material is reciprocated past the slicing knife. More specifically, the invention relates to that type of slicing machine having a knife which is inclined from the vertical, and a food trough which is also inclined to the vertical and perpendicular to the cutting plane of the slicing knife, whereby the material may be fed by gravity to the cutting plane of the knife or the material may be assisted to feeding position by means of a spring urged pusher plate.

An important object of the invention is the provision of a new and improved slicing machine main frame adapted to be cast as a single unit, and which is so constructed and arranged that there will be no sharp corners, to permit the machine to be easily cleaned and to provide sufficient space to place the slice receiving tray, or a sheet of paper, to receive the slices a sufficient distance with respect to the knife so that the cut slices will fall in the center of the tray or the paper.

Another important object of the invention is the provision of new and improved means for arranging safety features with respect to the cutting knife so as to protect the operator at all times, particularly when the machine is being cleaned.

A further object of the invention is the provision of a meat table adapted to be reciprocated in a rectilinear path and mounted upon a new bearing construction to facilitate ease in operation and to effect proper slicing of the substance.

A still further object of the invention is the provision of new and improved means for hanging, mounting and supporting the drive motor in the main frame to provide for proper belt tension and to permit easy access to the motor and removal thereof.

Still another object of the invention consists in the provision of a knife support which is adapted to enclose a large pulley to provide sufficient space under the knife shield, there being a belt cover plate for closing the front of the knife support, or box.

Still another object of the invention is the provision of a gauge plate embodying new and improved means for effecting the operation thereof, whereby the gauge plate can be manipulated easily, accurately and quickly, and which prevents sagging or deflection of the gauge plate, there being provision for effecting adjustment of the gauge plate with respect to its mounting so that the gauge plate may be adjusted easily to keep it in proper parallelism with respect to the slicing plane of the slicing knife.

Another important object of the present invention, resides in the novel features of construction pertaining to a new and improved knife support and the manner of mounting and adjusting the same; a new and improved slice deflector, the manner in which the deflector is arranged and constructed, and the manner in which the deflector is mounted and supported; a new and improved knife guard and finger guard and the manner in which these elements are constructed, positioned and mounted; a new and improved knife sharpener cover, the manner of arranging, constructing and positioning the cover with respect to other elements of the machine; an improved knife supporting box or bracket, the manner of securing the same to the machine and the manner in which the support is positioned, and, in addition, acting as a cover for a part of the main frame over the motor; and the arrangement, construction and positioning of numerous other parts, devices and elements which constitute other parts of the machine.

Numerous other objects and advantages will be apparent throughout the specification which follows.

The accompanying drawings illustrate a certain selected embodiment of the invention, and the views therein are as follows:

Fig. 1 is a detail perspective view of the improved slicing machine showing the rear and right-hand sides thereof (from the operator's stance);

Fig. 2 is a detail perspective view of the improved slicing machine showing the front and left-hand sides thereof (from the operator's stance);

Fig. 3 is a detail bottom plan view;

Fig. 4 is a detail perspective view of the one-piece main frame;

Fig. 5 is a detail elevational view looking forwardly from the operator's stance, the part of the frame and the knife supporting box and bracket being shown in section;

Fig. 6 is a detail perspective view showing the manner in which the food trough is connected to the carriage, and the manner in which the carriage is slidably mounted on the guide bars or rods;

Fig. 7 is a detail elevational view of the right-hand side of the machine, looking in the direction of the arrows 7—7 of Figs. 2 and 8, parts being broken away and omitted for the sake of clearness;

Fig. 8 is a detail sectional view on the lines 8—8 of Figs. 7 and 11, showing the manner in which the drive motor is arranged within the main frame and supported therein;

Fig. 9 is a detail elevational view looking in the direction of the arrow 7—7 of Fig. 8, and showing the manner in which the motor is supported, and the manner in which the main knife drive pulley is driven from the drive motor;

Fig. 10 is a detail sectional view on the line 10—10 of Fig. 8, showing the manner in which the motor is suspended and the manner in which the motor may be secured to the motor housing part of the main frame;

Fig. 11 is a detail elevational view of the main frame and its motor housing with the motor positioned therein, said view looking in the direction of the arrows 11—11 of Fig. 4;

Fig. 12 is a detail front elevational view of the knife box, looking in the direction of the arrows 12—12 of Fig. 5, the slice deflector being included;

Fig. 13 is a detail end elevational view, looking in the direction of the arrows 13—13 of Fig. 12, slice deflector omitted;

Fig. 14 is a detail bottom plan view of a part of the machine and showing some of the mechanism for operating the gauge plate;

Fig. 15 is a detail sectional view taken substantially on the line 15—15 of Fig. 14, and showing the gauge plate operating knob and the worm which is rotated thereby, certain parts being omitted for the sake of clearness;

Fig. 16 is a detail transverse sectional view on the lines 16—16 of Figs. 3 and 14;

Fig. 17 is a detail top plan view of the gauge plate, looking in the direction of the arrows 17—17 of Fig. 18, and showing some of the cooperating mechanism for operating the gauge plate;

Fig. 18 is a detail end elevational view of the construction shown in Fig. 17, said view looking in the direction of the arrows 18—18 of Fig. 17;

Fig. 19 is a detail perspective view of the guiding element or bracket cooperating with the gauge plate for effecting stability and ease of operation thereof, and constituting a part of the gauge plate operating mechanism;

Fig. 20 is a detail vertical sectional view through the gauge plate and some of its cooperating mechanism, said view being taken on the line 20—20 of Fig. 17;

Fig. 21 is a detail perspective view of the worm gear drive and some of the associated gauge plate operating mechanism;

Fig. 22 is a detail elevational view of certain parts of the structure shown in Fig. 21;

Fig. 23 is a detail sectional view on the line 23—23 of Fig. 20;

Fig. 24 is a detail elevational view somewhat similar to Fig. 7 but showing the cover on the knife box, parts being broken away for the sake of clearness, said view being taken on the line 24—24 of Fig. 5;

Fig. 25 is a detail perspective view of the knife box cover;

Fig. 26 is a detail perspective view of the knife edge finger guard which is shown applied to the machine in Fig. 24;

Fig. 27 is a detail elevational view similar to Figs. 7 and 24, but showing the knife center plate and its cooperating knife guard arranged in position with respect to the cutting knife, said view looking in the direction of the arrows 27—27 of Fig. 5;

Fig. 28 is a detail perspective view of the knife center plate and its cooperating knife guard;

Fig. 29 is a detail sectional view on the line 29—29 of Fig. 27, and showing the manner in which the knife box cover, the knife edge finger guard and the knife center plate are mounted removably on the knife box;

Fig. 30 is a detail sectional view similar to Fig. 29, but showing the fastening means for the said cover, knife edge finger guard and knife center plate, said view being taken on the line 30—30 of Fig. 27;

Fig. 31 is a detail front sectional view on the line 31—31 of Fig. 32, and showing the manner in which the knife center plate is secured in position;

Fig. 32 is a detail transverse sectional view on the line 32—32 of Fig. 31, and showing the manner in which the slice deflector is adjustably and removably mounted on the knife box;

Fig. 33 is a detail elevational view showing the manner of attachment of the knife edge finger guard and the knife center plate to the body of the machine;

Fig. 34 is a detail transverse sectional view on the lines 34—34 of Fig. 27, showing particularly the locking device for locking the knife center plate in position; and Fig. 35 is a detail view showing a modified form of construction which may be used for supporting the upper remote end of the gauge plate to a part of the slicing machine frame, such as a part on the knife box.

The invention herein disclosed is applicable to any type of slicing machine for slicing foodstuffs, but is shown specifically as relating to a gravity feed machine.

The slicing machine of the present invention comprises a supporting structure or main frame 1, Figs. 1 to 4, which is integrally cast of aluminum, cast iron or other suitable material. The main frame 1 includes an upstanding housing or casing part 2 in which a driving motor 3, Fig. 3, is mounted.

A knife box 4, Figs. 5, 12 and 13, is operatively supported on the motor casing 2 of the main frame 1 and supports the driving mechanism for a rotatively mounted slicing knife 5, Fig. 5, which is inclined from the vertical. A food table 6, Figs. 1, 2, 5 and 6, is inclined, as shown in Figs. 1, 2 and 5, and is demountably positioned. The food table is preferably V-shaped and is arranged perpendicular to the slicing knife 5 so that substance carried by the meat table will be fed by gravity to the cutting plane of the knife 5 for cutting slices from a piece of substance. The inclined V-shaped slicing food table is removably mounted on a bracket 7, Figs. 1 and 5, which is connected to a part 8 of a slide carriage 9, Fig. 6, whereby the food table may be reciprocated in a rectilinear path. A gauge plate 10, Figs. 1, 2 and 7, is provided to gauge the thickness of slices to be cut from the substance by the slicing knife 5. A knife center plate 11, including a knife guard 12, Figs. 1, 2, 5, 27 and 28, is arranged within the concave face of the dished cutting knife 5, and covers a knife edge finger guard 13, Fig. 26. A slice deflector 14, Figs. 2 and 32, is arranged on one side of the knife 5 to deflect slices as they are cut to permit them to fall in stacked formation on the upper surface of a part of the main frame 1. Knife sharpening mechanism is arranged within a knife sharpener casing 15, Figs. 1, 2 and 27, which is recessed in the knife box 4.

Main frame 1

The main frame 1 of the slicing machine, Figs. 2 and 4, preferably comprises a one piece casting of aluminum, cast iron, or the like material properly treated by oxidization, vitreous enamel or other susbtances, depending upon the material selected, so as to present a smooth clean finish which may be cleaned quickly and easily. The main frame 1 has smooth sloping lines merging into the various housings or casings in which the several operating elements of the machine are arranged so as to provide smooth, easily cleanable surfaces, and to present a highly ornamental and streamlined appearance.

The main frame 1, Figs. 3 and 4, comprises a flat top part 16 which acts as a slice receiving table upon which the cut slices will fall. A downwardly extending peripheral flange 17, extends peripherally about the entire main frame. This flange 17 marginally encloses the lower part of the frame 1 beneath the top 16, and acts as strengthening means to make the frame 1 rigid, as well as to enhance the appearance of the machine. The bottom of the frame 1, Fig. 3, is provided with angularly extending ribs 18 which are integral parts of the frame to strengthen the frame throughout, and to render rigidity thereto. Some of these strengthening ribs 18 may be arranged in parallelism, as shown in Fig. 3, whereby they may act as a conduit trough to receive the electric conductors leading to the motor, as well as for strengthening purposes. A cover (not shown) of sheet metal, or the like, may be mounted at, or near, the bottom edges of a pair of parallel ribs 18 to cover and conceal the conduits or electric cable conductors, thereby protecting the electric conductors, and preventing foreign matter from getting to the electric lines and connections. Bosses 19 are integral with the base, Fig. 3, being located on the underside of the frame, and these bosses include the purpose of permitting feet or rests 20 to be mounted removably on the main frame 1. These feet or rests 20 may be in the form of flexible suction cups, made of rubber, or the like material, to provide a proper support for the machine, and to prevent creeping of the machine during operation. These cup-like feet 20 tend to hold the machine on the table or other surface upon which the machine is supported. An integral longitudinal strengthening rib 21, Fig. 3, also depending from the underside of the main frame, acts further as a support to which a slide bar or rail 22 may be secured. A cooperating slide bar or rail 23 is adapted to be secured removably to a boss 19 and to an additional boss formed integrally on the underside of the frame adjacent the inside of the ends of the peripheral flange 17, Fig. 3.

The integral main frame 1 has an integral motor housing or casing 2, Fig. 4, formed at the rear thereof at the left-hand side of the machine (as viewed from the operator's stance looking forwardly). The front of the motor housing 2 (that part toward the operator's stance) sweeps upwardly and rearwardly in smooth lines, curving upwardly from the front, where it connects integrally with the flat part or slice table 16 of the frame, toward the rear. The front side 24 of this housing 2 extends transversely across a greater part of the frame, inclining upwardly in a relatively straight line from a point near the left-hand side of the machine toward the right-hand side of the machine, as indicated at 25, Figs. 4 and 5.

The left-hand side of the motor housing 2 extends upwardly for a predetermined distance in a relatively straight line from the left side of the marginal or peripheral depending flange 17 and flush with said flange as indicated at 26, Figs. 4 and 5. This straight left-hand part 26 of the frame motor housing then inclines upwardly from left to right at a relatively sharp angle as indicated at 27, Figs. 4 and 5, until it meets the sharpwardly inclined part 28 at the right side of the frame motor housing.

The rear 29, Figs. 1 and 4, of the frame motor housing extends upwardly and flush with rear marginal flange 17 for a predetermined distance, and then curves forwardly (toward the operator's stance) as indicated at 30, Figs. 1, 4 and 7. The frame motor housing 2 is in the form of an inverted U in longitudinal cross section, as shown in Fig. 4. The rear end of the main frame 1 is in the form of an inverted V in elevation as viewed in Fig. 1, and merges with a relatively flat part 31, Fig. 4, at the extreme right-hand side of the machine (to the left Fig. 1). The connection of the slanting right side part of the housing (to the left Fig. 1), merging with the said straight part 31 by a smooth curving line 32, Figs. 1 and 4. The rear right-hand side of the frame motor housing 2 extends in a plane higher than the forward right-hand part of the said housing whereby there is provided an offset flat inclined part or face 33, Figs. 4 and 11, upon which the knife box 4 in the form of a single cast body 34, Figs. 7, 12 and 13, is secured and recessed. The right inclined face 30 of the frame motor housing is provided with an opening 35, Figs. 7 and 11, therein to permit operating access to the pulleys 36 and 37, Figs. 3, 7 and 8, on the shaft 38 of the electric driving motor 3, Figs. 7 and 8. The higher right part 28 of the frame motor housing (toward the rear) is slightly higher than the extreme end of the motor shaft so that when the knife box 4, 34 is applied in recessed position, and a cover plate 39, Figs. 5, 24 and 25, is mounted on top of the knife box 4, there will be a smooth flush surface and all the knife operating parts will be totally encased and housed, Figs. 5 and 24.

The main frame 1 includes a relatively rounded upwardly extending integral formation or cover housing 40, Figs. 1, 4, 5, 7 and 8, which extends from front to back along the extreme right-hand side of the frame. The top rounded part 41 is relatively straight and is flush with the right-hand side of the marginal or peripheral flange 17 terminating in the said curved or rounded top 41, Figs. 4, 5 and 8. This rounded formation or part 40, 41 provides a housing or cover 42 for the slide rods or bars 22 and 23, Figs. 3, 5 and 8, as well as forming an obstruction or abutment 43, Figs. 2 and 5, for a pan (not shown) to receive cut slices. It also prevents parts, slices or scraps of substance from falling off the slice receiving top 16 of the frame. The extreme rear end of the rounded housing or cover part 41, 42 (away from the operator) merges with the right side of the frame motor housing, as indicated at 44, Figs. 1, 4, 5, 7 and 8. The rounded part 41 sweeps downwardly from right to left in smooth curves and merges with the table top part 16 of the frame, Fig. 2.

The formation or integral housing part 40—42 merges at the extreme front of the frame with an enlarged portion to provide a housing part 45, Figs. 1, 2, 4 and 7, for the operating mechanism for the gauge plate 10, as well as providing a supporting surface 46, Figs. 1, 2, 4, 13 and 20, upon which the gauge plate 10 is slidingly mounted.

The table top part 16, Figs. 1, 2 and 4, of the main frame 1 acts as a slice receiving table top or tray to receive slices as they are cut consecutively. Also, this top or table 16 is adapted to receive removable individual trays upon which the cut slices fall. Instead of individual trays, sheets of paper may be used to receive the cut slices. This table top 16 is depressed somewhat, there being an upstanding rounded rib-like or ridge formation 47, Figs. 2 and 4, along the front edge of the frame (near the operator), and along the left-hand side of the machine. The left rib or ridge-like formation 47 extends to the front face of the frame motor housing and merges therewith, Figs. 2 and 4. The front ridge or rib 47 extends to the part of the frame which acts as the housing part 45 for the operating mechanism of the gauge plate 10 and merges with the said housing part. The recessed table top 16, therefore, is bounded on the front and on the left side by the continuous integral raised left rib or ridge 47. The recessed top 16 is bounded on the rear by the front 24 of the frame motor housing 2, and on the right by the upwardly extending raised formation 40, 41. The round housing part 40—42 and the part 45 act as the housing for the slide rod or bar 23 and for the operating mechanism of gauge plate 10, Figs. 5 and 8.

The depressed table top 16 of the main frame 1 is so configurated that the depressed part thereof extends rearwardly an appreciable distance beyond the center of the knife 5, Fig. 1, and to the right of the machine an appreciable distance beyond the lower edge of the inclined knife; also, an appreciable distance beneath the knife 5 and its guard. The depressed table top 16 is below both the right and left faces of the knife, Figs. 1, 5 and 7. The construction and arrangement of the depressed table or slice receiving tray part 16 is characterized by providing a depressed flat table under and adjacent all operating parts so that cleaning cloths may be passed under, about and around all surfaces so as to clean thoroughly, easily and quickly all surfaces adjacent the operable parts, particularly the knife, and still prevent meat juices, scraps and parts from falling into or draining upon or into operable parts of the machine. The frame 1 is characterized, further, in having the parts constructed and arranged, and of such a contour and design, as to permit it to be cast as a single unit, thereby permitting easy, quick and economical manufacture.

*Motor mounting 3*

The motor 3 is adapted to be mounted pivotally or swingingly and arranged for easy and quick removal for replacement, repair and inspection. The motor 3, of the usual type, includes its ordinary casing 48, Figs. 7 to 11, and is held in its pivotally mounted position by a rod 49, Figs. 8–10, engaging a guiding or pivot hole 50, Fig. 3, in the slicing machine frame 1, and by a single securing bolt 51 passing through a block 52 and threadedly engaging the housing 2, Fig. 3. The entire motor 3 may be removed by merely unscrewing the single bolt 51.

A semi-circular strap 53, Figs. 3, and 8 to 10, encircles a part of the motor casing 48 between the front and rear ends of the motor. One end of the strap 53 is configurated or curled to form a hollow, relatively tubular eyelet part 54 through which the rod 49 is inserted. The extreme end 55, Fig. 10, of the tubularly formed part 54 of the strap 53 is slightly spaced from the outer surface of the strap 53, Fig. 10, so as to receive slidingly the deformed, crimped, or substantially triangular bead 56 on the end of a flexible metal encircling band 57. The deformed end or bead 56 is formed by bending the band 57 near, or at one end, as shown more specifically in Fig. 10. The end 56 of the band 57 is slipped into the space between the curled end 55 and the main body of the band 53 whereby the crimped end 56 will be located inside of the tubular or eyelet part 54, causing the band 57 to be locked removably to one end of the strap 53.

The other free end 58 of the band 57 is bent over upon itself to form a stirrup-like part 59, Figs. 7 and 9, which provides a hollow part 60 to receive securing bolts 61. The ends of the band are welded or otherwise secured together as indicated at 62, Fig. 9. The heads of the attaching bolts 61 are arranged in place before the part 59 is deformed into stirrup-like formation, there being spaced holes provided in the end of the stirrup-like part 59 to permit the threaded shanks or stems of the bolts 61 to pass, Fig. 9. The shanks of the bolts 61 pass through holes in the outer end of the strap 53, and nuts 63 tighten the band 57 and the strap 53 about the motor casing 48. The strap 53 and band 57 provide a supporting hanger for the motor 3, Fig. 9.

The motor is hung pivotally or swingingly by means of the aforesaid rod 49 and the bolt 51.

One end of the rod 49 passes through the guiding or pivot hole 50, the other end of the rod 49 carrying the block 52 which is fixed thereto in any desirable manner such as by a press-fit, or by welding. This block 52 has a smooth hole therethrough through which the bolt 51 passes, the bolt 51 being received threadedly in a threaded hole in the machine frame, Fig. 3. The rod 49 is loosely mounted, that is, mounted so as to permit revoluble or oscillatory movement in the curled or eyed tubular end part 54 of the strap 53, whereby the entire motor is suspended pivotally in the frame and movable about the rod 49. This pivotal mounting of the motor permits the motor to act as a belt-tightener inasmuch as the weight of the motor may bear on the belts 64 which are trained over the pulleys or sheaves 36, 37 on the shaft 38 of the motor 3, Figs. 3 and 7.

A leaf spring member 65, Figs. 3 and 8, in the form of a piece of flat springy metal, is adapted further to act as a belt-tightener. This leaf spring 65 is secured in relatively fixed position with respect to the motor by the same bolts 61 which secure the stirrup end 60 of the band 57 to the strap 53, Figs. 3 and 8. The leaf spring 65 has holes therethrough to permit the shanks of the bolts 61 to pass, nuts 66, Figs. 3 and 9, being provided to lock the leaf spring 65 in position against the outer surfaces of the first mentioned nuts 63. The free end 67 of the leaf spring 65, Fig. 8, is adapted to be sprung or flexed under a projection 68, Fig. 8, on the main frame, thereby providing a tension or urging action on the leaf spring 65. This urging or spring tension of the leaf spring 65 tends to urge springly the motor 3 in a direction so as to tension further the belts 64, thereby providing belt tightening means. The weight of the motor 3, having pivotal movement in a restricted arcuate path, and the leaf spring 65 tending to urge the motor further in said arcuate path, provides simple and positive belt tightening means.

Knife box 4

A one piece cast knife box 4, Figs. 5, 12, 13 and 24, is mounted on the flat offset inclined part of face 33 of the frame motor housing 2, being secured removably thereto by means of screws or attaching bolts passing through holes in the knife box, and threadedly engaging alined holes in front of the frame motor housing. The securing screws or attaching bolts pass through the holes in the knife box near the center of the knife bearing, thus giving the knife box more rigidity and overcoming any danger of the deflection of the parts. The attachment near the knife bearing provides a rigid support of the box and renders stability for the bearing. The contour of the knife box 4 is such as to conform as far as possible to the general contour of the surrounding parts of the machine, especially the frame motor housing. The knife box casting 4 is cut contoured as at 69, Figs. 7 and 12, so as to permit free passage of the motor shaft 38 and driving pulleys 36, 37 to extend to or nearly to the outside edge of the peripheral flange 70 which surrounds nearly the entire casting 34. The casting 34 carries a hub 71, Figs. 12 and 13, into which a bearing 72 on the knife driving pulley 73 is received, Figs. 5, 7 and 24. The bearing 72 rotatively supports a shaft 74, Fig. 5, on the knife driving pulley 73, the bearing 72 being locked removably in the hub 71 by a set screw 75, Fig. 5, and while the shaft 74 is rotatively arranged in the bearing 72, the bearing 72 is prevented from rotating and from moving axially. The knife driving pulley 73 is adapted to be driven by the V-belts 64 which are driven from the drive pulleys 36, 37 on the motor shaft 38. One side of the peripheral flange 70 of the knife box 4 is cut away along a relatively straight plane, as indicated at 76, Figs. 5, 7, 12 and 24 to prevent interference to the knife drive pulley 73, this arrangement being desirable to permit the pivotally mounted slice deflector 14 to be arranged in close proximity to the motor housing, the knife box 4 (casting 34) and the cutting edge of the knife 5 at the rear face of the latter. The peripheral flange 70 of the knife box 4 constitutes a part of the exterior frame of the machine, and merges and harmonizes with the contour generally of the machine frame and the main frame. The stainless steel knife box closure plate 39 is provided to cover the open front of the knife box.

Knife box closure plate 39

The opening 76 in the flange of the knife box 4 is closed by a depending lip or flange 77, Fig. 25, bent from the sheet metal closure plate 39 which completely covers the front or open side of the knife box 4. There is, however, an opening 78 in the stainless steel cover plate 39 to permit attachment of the slicing knife 5 to the hub part on the knife driving pulley 73, Figs. 5 and 25. The knife box closure plate 39 is held in position by the knife edge finger guard 13, Figs. 24 and 25.

Slicing knife 5

The circular slicing knife 5, in the form of a dish, is adapted to be driven by the driving shaft 74, Fig. 5, which projects outwardly from the hub part of the knife driving pulley 73. The knife 5 has a central hole 79, Figs. 5 and 24, provided therein in which the driving bearing of the drive pulley 73 extends. The driving bearing carries a circular drive pin 80, Fig. 24, positioned at an edge of the driving bearing, the drive pin 80 being receivable in a comparable opening adjacent the central opening 79 in the knife 5. The metal of the knife, surrounding the central opening 79 in the knife 5, hugs snugly the driving bearing part of the driving pulley 73 and the circular pin, and, therefore, when the knife driving pulley 75 is operating, the knife is forced to rotate. The knife 5 is locked to the driving bearing part of the knife drive pulley 73 by means of the knife bolt 75, Figs. 5 and 24, which threadedly engages a central threaded opening in the drive shaft 74, the threaded engagement of the knife bolt and central opening being such that rotation of the knife tends to tighten the bolt 75. The head of the knife bolt 75 is in the form of a relatively large thick cap 81 to support the knife centrally about a relatively large bearing surface. Spaced holes 82, 82, Figs. 5 and 24, in the cap 81 are provided to receive a spanner wrench for tightening or untightening the knife bolt. A limit screw 83, Figs. 5 and 24, having a rawhide or fibre head, may be screwed centrally in the knife bolt cap to keep the center of the knife center plate 11 away from the knife a proper distance to prevent any interference of the knife center plate 11 with the knife 5.

Food table 6

The demountable food table 6 for the slicing machine of this present invention is in the form of a V-shaped trough and is substantially as shown and described in the copending application of Paul H. Meyer, Serial No. 576,633, filed February 7, 1945, now abandoned. The food supporting table 6, Figs. 1, 5 and 6, is attached demountably to the bracket arm 7, the lower end of which is attached to the slide carriage 9, whereby the food table or trough 6 may be reciprocated manually to and fro in a rectilinear path past the cutting knife 5 to have slices cut from the substance.

A food pusher of the type shown in said application, Serial No. 576,633, filed February 7, 1945, and shown more in detail in the United States application of Meyer, Serial No. 562,101, filed November 6, 1944, now Patent 2,482,787 is adapted to be used in the V-shaped food table or trough to urge the substance toward the slicing plane and against the gauge plate.

Slide carriage 9

The slide carriage 9, Figs. 3, 5, 6 and 16, comprises a casting which includes a sleeve 84 on one side, the sleeve 84 being slidable on the round guide rod 22. The guide rod 22 is secured by screws to lugs or bosses formed on the underside of the machine main frame, Fig. 3. The sleeve 84 is provided with a longitudinal groove or slot 85, Fig. 16, to permit the sleeve to pass over the lugs or bosses during reciprocal movement of the food trough 6. The other side of the casting (on the right-hand side of the machine) has an upstanding flange or bracket part 86, Fig. 6, to which a ball bearing roller 87 is rotatively mounted. The bottom of the roller 87 rests upon the rectangular bar 23 which is secured to the right side flange 17 of the main frame 1 and extends from front to rear of the machine, Fig. 3. This bar 23 is parallel to the circular guide rod 22 and chiefly supports the load on the food table or trough 6. A set screw, Figs. 3 and 5, is arranged below the bar 23 to prevent the carriage from shifting upwardly, the bar 23 being between the roller 87 and the said set screw. The casting also includes the part 8 which protrudes outwardly beneath the lower edge of the depending peripheral flange 17 of the main frame 1, at the right side of the machine. The bracket arm 7 of the food table 6 is adapted to be fastened detachably to this projecting part 8 of the casting of the carriage 9 by means of screws 88, Figs. 3 and 6. Rubber bumpers 89, Fig. 3, are mounted on each end of the casting and engage boss pads or projections on opposite ends of the machine.

Gauge plate 10 and gauge plate operating mechanism

The gauge plate 10, Figs. 2, 7 and 17 to 20, is provided to determine, beforehand, the thickness of slices of material to be cut. The gauge plate 10 is operable throughout a predetermined range of movement so that the gauging face 90 of the gauge plate 10 will be in a plane parallel to the cutting plane of the slicing knife 5. Substance is placed in the food trough 6 with an end against the face 90 of the gauge plate 10 according to the adjusted position of the gauge plate to have the substance sliced as the substance is moved across the cutting edge of the slicing knife during reciprocation of the food table 6. The gauge plate 10 may be of any suitable constructed, properly contoured type, preferably cast in one piece from suitable material, as shown, or it may be of the type and construction disclosed in the copending application of Paul H. Meyer filed February 7, 1945, Serial No. 576,633. Other gauge plate constructions capable of use with the present invention are disclosed in the copending applications of Arthur H. Ahrndt filed May 19, 1945, Serial No. 594,722, now abandoned, and Harry C. Pfister and Paul H. Meyer filed March 24, 1945, now Patent No. 2,522,372, Serial No. 584,572, all assigned to the present assignee.

The present gauge plate 10 of the invention is formed with a front circular cut-out or concave edge 91 to conform with the circular shape of the knife 5 and acts to protect the knife edge. The gauge plate 10 is secured to a housing part 92 to form a projection or ledge 93, Figs. 7, 17, 18 and 20, extending outwardly from the gauging face 90 thereof to provide means for attaching and supporting the gauge plate 10 operably to the machine. This ledge 93 of the housing 92 further acts as a support for a piece of substance, particularly for supporting a piece of bacon for derinding the same. This ledge part 93 of the housing 92 also acts as a drain for catching meat juices and draining the juices onto the depressed table top 16, and thereby prevents these juices from draining onto, or seeping into, the machine and perhaps onto operable parts of the machine. The ledge or projection part 93 of the housing 92 is curved slightly in a horizontal plane, from front to rear, so as to drain definitely any juices onto the depressed slice table top 16.

The housing 92 also includes a boss or extension housing part 94 integrally cast with the housing 92, as well as a bearing part 95, Figs. 17, 18 and 20, which extends rearwardly of the housing 92 (to the left of the machine), the said bearing part 95 being cast integrally with the housing 92. The rear face of the gauge plate 10 (to the left) is bulged rearwardly at its lower end, near the middle thereof, to provide a cover or cap 96 for the bearing part 95 and to conceal the bearing part 95, Figs. 18 and 20.

The bearing part 95, Figs. 17–20, has a hole 97, Fig. 20, formed therein in alinement with a hole 98 in the extension part 94 to receive a guide pin or rod 99 upon which a fixed bracket 100, Figs. 19 and 20, is mounted, whereupon the gauge plate 10 may be mounted slidingly on the bracket 100 so as to move the gauge plate 10 to and from the cutting plane of the knife, Figs. 17–20 and 23.

The alined holes 97 and 98 and the cooperating guide pin 99 are inclined vertically, and at an angle with respect to the knife cutting plane, so that the gauge plate 10 may be caused to move away from the plane of the knife as well as be moved away from the cutting edge of the knife 5 thereby permitting a slice being cut to pass freely between the forward edge of the gauge plate 10 (away from the operator) and the cutting edge of the knife 5. The gauge plate 10 and the housing 92 to which the gauge 10 is attached are, therefore, free to slide on the bracket 100. The bracket 100 has a boss 101, Fig. 19, formed thereon through which the pin 99 passes, the bracket 100 being secured rigidly to the main frame. A set screw 102, Fig. 20, is carried by a part of the aforesaid extension part 95 to limit the slidable movement of the gauge plate in one direction (to the right of the machine). Movement of the gauge plate 10 on the bracket 100 in the opposite direction (to the left) is limited by an edge of the housing 92. The gauge plate 10 therefore, is slidable on the bracket 100 between certain limits, the limits being the aforesaid set screw 102 and the aforesaid edge. The bottom edge of the housing 92 is ground smooth and flat to provide a slide bearing surface 103 with a similar cooperating bearing surface 104, Fig. 18, of the bracket 100. The bearing surfaces of the two members are spaced apart longitudinally so that there will be full support between the housing 92 and the bracket 100 so as to prevent definitely any wiggling, shimmying or canting of the gauge plate with respect to its support, and to permit smooth slidable movement of the gauge plate in a straight diagonal line on the bracket 100.

The bracket 100 is adapted to rest upon, and to be secured to, a flat inclined attaching face 105 of part 46, which is formed on that part of the rounded housing formation 45 which acts as a housing for the gauge plate operating mechanism, the said face 105 being located at the front of the machine (adjacent the operator's stance) and at the extreme right-hand side of the machine but on the left-hand side of said housing part. The bracket 100 has its attaching face 106 provided with threaded openings 107, Figs. 17 and 19, into which screws 108, Fig. 17, are received threadedly to fasten the bracket 100 to the main frame 1. The attaching face 105, Fig. 17, on the frame 1 is provided with openings which are in alinement with the threaded openings in the bracket 100, but the openings are oversized with respect to the shanks of the screws 108 so that a certain amount of adjustment may be had for the bracket 100. Therefore, the gauge plate 10 is capable of a certain amount of angular adjustment with respect to the main frame 1, whereby it is possible to get the gauging face 90 of the gauge plate 10 in perfect parallelism with the cutting plane of the knife 5. The relatively large holes in attaching surface 105 provide for such shiftable movement of the bracket, and inasmuch as the housing 92 on the gauge plate is guided positively by the guide rod 99 in the bracket fitting 100 and the openings 97 and 98, there is always provided accurate and proper parallel movement of the gauge plate 10 with respect to the knife slicing plane.

The gauge plate housing 92 also carries a rigid pin 109, Fig. 20, receivable in a sleeve 110, Figs. 3, 14 and 20 to 23. The sleeve 110 passes through a cut-out 111 in the bracket 100, the said sleeve 110 being secured rigidly to one end of a link 112, Figs. 14, 17 and 20 to 23. A second sleeve 113, Figs. 14 and 21, is secured to the other end of the link 112, but on the other side thereof, Figs. 14 and 21, and surrounds and receives a pin 114 formed on a tail-piece or arm 115 which is integrally cast with a segmental worm gear 116. The segmental worm gear 116 is rotatively mounted on a pinion shaft 117, Fig. 20, which has an eccentric bore 118, Fig. 21, therethrough into which a set screw 119, Figs. 20 and 21, passes to attach the pinion shaft 117 rigidly to a boss 120, Fig. 20, on the frame 1. The set screw 119 locks the pinion shaft 117 to the frame 1, and allows the segment gear 116 to move rotatably thereon. The eccentric opening 118 through the pinion shaft 117 allows the pinion 116 to be eccentrically positioned with respect to a manually operated worm 121, Figs. 3, 20 and 23, to bring the teeth on the segmental worm gear into proper meshing relationship with the worm 121 whereupon proper adjustment may be had with respect to the worm gear 116 and the worm 121. Also, this adjustable feature of the worm gear 116 permits the worm gear 116 to be adjusted with respect to the worm 121 so as to bring certain of the teeth on the worm gear 116 into meshing relationship with the worm 121 whereby the worm gear 116 may be set at a definite position to effect operation of the segment gear 116 within certain definite limits.

The worm 121, Figs. 15 and 23, is an integral part of a shaft or rod 122, Figs. 15 and 23, which is operated by turning an operating knob 123, Figs. 14, 15 and 23. The shaft or rod 122 passes through a bore in a boss 124 formed on an end flange 17 on the underside of the frame 1. This shaft 122 is provided with a sleeve 125, Fig. 15, into which the shaft or rod 122 is received. A set screw 126 locks the sleeve 125 rigidly to the part 122 of the worm 121 whereby the shaft or rod 122 has free rotative movement but is prevented from moving or shifting longitudinally because of a ring fixed to boss 124.

A translucent circular indicator dial 127, Figs. 14, 15 and 23, is fixed rigidly to the knob 123, Fig. 15, and rotates along with the knob during manual rotation of the knob. The circular indicator dial 127 is provided with spaced graduations 128, Figs. 2 and 23, indicative of slice thicknesses. The indications or graduations indicate the number of slices per one inch of substance to be sliced. The translucency of the indicator dial 127 permits the graduations to be seen easily, especially when a light is arranged behind it. The indicator dial 127 is in the form of a circular flared or conical-like skirt, and is preferably made of plastic material which completely encircles the shaft or rod parts 122, 125, and the knob at the inner end of the knob 123. The outside wall of the main frame may be recessed slightly at 130, Fig. 15, into which recess the outer end of the skirt-like dial 127 is received. A fixed pointer or indicator 129, Figs. 2, 4 and 23, on the outside of the main frame cooperates with the graduations on the dial, whereby the operator may determine the number of slices to cut per inch of material by the designating graduation in line with the pointer.

A spring 131, Fig. 14, has one of its ends connected to a rigid part of the frame and its other end connected to a pin on the link 112 so as to maintain the parts in position, and the teeth of the gear 116 and the worm 121 in mesh, preventing looseness between the parts.

The worm 121 is free to rotate upon rotation of the knob 123, but is prevented from moving axially. The shaft or rod 122 is rotated by manually operating the knob 123, whereupon the worm 121 is given rotative movement. This rotative movement of the worm 121 is transmitted to the segmental worm gear 116 which, in turn, shifts arcuately or orbitally the integral tail-piece 115 on the worm gear 116 and its attached pin 114. The sleeve 113 on the link 112 encircles this latter pin 114 and, therefore, moves the link 112. Movement of the link 112 also shifts the other sleeve 110 which surrounds the pin 109 rigid with the housing 92 on the gauge plate. Manual rotative movement of the knob 123, therefore, shifts the gauge plate 10 toward or away from the slicing plane of the knife 5. The parts are so arranged that rotative movement of the knob 123 in a counter-clockwise direction moves the gauge plate 10 away from the slicing plane, while movement of the knob 123 in clockwise direction shifts the gauge plate 10 toward the slicing plane. The movement of the gauge plate 10 is not only lateral in a plane parallel with the knife cutting plane, but also in a rearward direction (toward the operator) whereby a greater opening is provided between the knife and the end of the gauge plate to permit the slices to fall through more easily and onto the table top 16.

The opening 98 in the boss part 94, in which opening pin 99 is received, extends completely through the boss part 94, Fig. 17, so as to permit easy assembly of the parts. This opening may be closed by a screw 132, Fig. 1, so as to maintain a neat outwardly appearance and to prevent any meat parts, juices or scraps from entering the opening.

*Knife center plate 11*

The knife center plate 11, Figs. 1 and 27 to 30, includes not only the center part 133, thereof, which fits in the concave part of the knife 5, but, also, the offset rim 134, Fig. 28, which merges or connects with an attaching part 135.

The knife center plate 11 preferably may be made of stainless steel and of a size so as to fit into the concavity of the front face of the knife 5. The center part 133 is preferably provided with horizontally disposed parallel alternate ridges and furrows, the substance engaging the ridges during the slicing operation and for a time during return movement of the food table 6. This ridge and furrow arrangement also tends to keep the substance from shifting inwardly during operation of the machine because of the ridges engaging the substance.

The center part 133 of the plate 11 is inside of the offset part 134 which projects outwardly and away from the face of the center place, the inclined offset part 134 merging with the outer flat attaching part 135. The inclined part 134, which merges with the flat offset straight part 135, may be integral parts of the knife center plate as shown, Figs. 27 and 28. The attaching part 135 of the knife center plate 11 is adapted to be secured to a leg 136 of an arcuated angle iron part 137 to stiffen the knife center plate and to provide attaching means for the said center plate. The other leg 138 of the angle member 137 provides the guard 12 for the knife 5 as well as providing a means for securing the knife center plate removably in position. The member 136 may be a a separate or an integral part of the knife center plate (separate attachment being shown in the drawings). The rim attaching part 135 overlaps the leg 136, being secured thereto by rivets or by other means. The arcuate angle member 137, whether integral with the center plate or as a separate part, includes the circular or arcuate depending flange 138 which surrounds the knife to form the guard 12. The guard 138, 12 also surrounds the knife edge finger guard 13, Figs. 29 and 30. The outer peripheral edge 135 of the knife center plate is shown as overlapping the leg 136 of the angle member 137. It is understood of course that it may be arranged under the leg 136, that is the leg of the angle iron may overlap the outer edge of the knife center plate. The knife center plate, therefore, may either overlap or underlap the outer leg of the angle member. In actual practice however it has been found desirable to position the part 135 under the leg 136.

The knife center plate 11 is secured in place by fastening removably the supporting guard flange part 12, 138 to the knife edge finger guard 13 or to a part or parts on said guard 13, and by the engagement of a slot 139, Figs. 27 and 28, formed in the center plate proper at the bottom thereof, with a headed stud 140 on the said knife edge finger guard 13, Figs. 27 and 29. The supporting angle member 137 which includes the depending arcuate flange part 138 is spaced from the said knife edge finger guard 13, and in a plane perpendicular to the knife cutting plane. A locking device 141, Figs. 33 and 34, is arranged on the flange 138, Fig. 33, near the upper part of the knife center plate, the locking device 141 being operated by a handle element 142 positioned outside of the depending flange part 138 which constitutes the guard 12. The locking device 141 includes a shaft part 143 extending through the flange 138, Fig. 34. The shaft or rod part 143 carries a locking bar 144 which engages under a part of the knife edge finger guard 13. The locking bar 144 is so arranged and constructed so that it will pass at one side of the guard 13 when the handle 142 is in a position at right angles, but to be in locked position under the said knife edge finger guard 13 when the handle 142 is in parallelism with the arcuate flange 138. A pin passes transversely through the rod 143 and handle 142 and connects the handle 142 and locking bar 144 rigidly together. The pin or rod part 143 has free limited slidable movement through the flange 138, there being a spring 145 arranged beneath the flange 138 and the top of the locking bar 144 to urge the locking bar 144 downwardly. The top of the locking bar 144 has cammed surfaces 146, Fig. 34, firstly to permit easy location of the locking bar, and secondly to lock the locking bar 144 into tight engagement with its keeper (the underside of the knife edge finger guard 13).

A set screw 147, Figs. 26 and 33, on a lug 148 on the knife edge finger guard 13 allows for a certain limited amount of adjustment of the center plate 11 so as to move the edge of the knife center plate 11 closer or farther away from the exposed cutting edge of the knife. Inward or outward movement of the set screw 147 moves the edge of the knife center plate 11 closer to or farther away from said exposed knife cutting edge, respectively (also see Fig. 33).

The entire center plate is applied and removed easily and quickly upon operating the handle 142 to lock and unlock the same. The center plate 11, including the guard 12, the face center part 133, the attaching part 135 and the sloping part 134, may be made in one piece by stamping, it may be cast integrally, or it may be made in two or more parts connected together whether the parts be cast, stamped or both. In some cases the extreme rear edge may be cut out as indicated at 149, Fig. 28, to permit further movement of the food table 6 rearwardly (away from the operator).

Knife edge finger guard 13

The knife edge finger guard 13, Figs. 24 and 26, comprises an integral one piece cast metal arcuately shaped member to cover substantially the extreme outer edge of the knife 5 at its outer and bottom edges so that the operator's hands will be protected, particularly when cleaning the machine. This edge guard 13 curves to conform with the circular shape of the slicing knife, 5, and while relatively thin and narrow, is thick and wide enough to render sufficient rigidity to it and to shield adequately the knife edge. The knife, of course, has its cutting edge spaced a sufficient distance from the angle member 137 of the knife center plate to provide for proper operation; therefore, the knife edge finger guard 13 must be spaced properly from the guard 12 (the flange 138 of the angle member 137) a distance sufficient to accommodate the knife edge finger guard and still be adjacent the knife 5. The knife edge finger guard 13 also must be spaced from the frame so as to be adjacent the knife.

The means for spacing the guard 13 from the face of the motor housing and for attaching the guard thereto comprises an offset upper part 150, Fig. 26, arranged at one end of the guard. The offset 150 terminates in a foot 151 in which there is provided a screw opening 152 to receive a screw 153, Fig. 24, to attach the foot to the frame motor housing 2. A lower lug 154, Fig. 26, cast near the other end has a hole 155 therethrough, Figs. 26 and 30, to receive the fastening screw 156, Fig. 30, to secure the lower end of the guard 13 to the frame motor housing 2. The screws 153 and 156 also pass through the stainless sheet steel plate 39 and thereby cause the steel plate to be locked in position when the screws 153 and 156 are tightened to fasten the edge guard in place to the motor housing. The knife edge finger guard 13 also has the boss 148 formed thereon to provide means for supporting the adjusting screw 147 to limit the movement of the knife guard flange 138 of the knife center plate, thereby providing a stop or rest for the said flange to support the flange and prevent movement of the knife center plate, and assuring positioning properly the knife center plate around the slicing knife. The headed pin 140, Fig. 29, is arranged in a hole in the lower lug 154, Figs. 26 and 29, to provide means for supporting removably the lower end of the knife center plate 11. The pin 140 is adjustably mounted in a hole in the lower lug 154 by means of a set screw 157, Fig. 29, to lock the headed pin 140 in adjusted position. The pin 140, therefore, may be moved inwardly or outwardly so that its head and a part of its shank may be set properly to engage easily the notch 139, Fig. 28, in the knife center plate 11.

Slice deflector 14

The slice deflector 14, Fig. 2, comprises a body member 158, preferably formed from a single sheet of metal, such as stainless steel, or aluminum, by a stamping or forming operation; or the body 158 may be cast metal, preferably aluminum. This slice deflector 14 has its body 158 properly contoured to fit snugly adjacent the bared cutting edge of the knife 5 and against the adjacent motor housing 2 so as to cover all cracks, crevices and adjacent operating parts of the machine, and to deflect properly slices as they are being cut from the substance. The body 158 has a bulged central part or section 159 which narrows from a relatively large end immediately adjacent the knife toward the outer end thereof. This bulge part 159 is integral, preferably, with the upper and lower parts 160 and 161, respectively, with which it merges in smooth curved lines, Fig. 2. The bulging part 159 is contoured further so as to conform generally with the side of the motor housing part of the frame against which it fits. The lower part 161 has its lower end substantially flush or even with the knife box 4 and the top of the slice receiving table 16.

The slice deflector 14 is pivotally mounted to the knife box 4, Figs. 29 to 32, by a pin 162 receivable and held in an opening 163 formed in a thickened part 164 at the lower end of the deflector body 158, Fig. 32. The knife box 4 has an enlargement or thickened part 165 through which there is an opening 166. A sleeve 167, Fig. 32, is arranged in the latter opening 166, the opening 166 being somewhat larger than the diameter of the sleeve 167 to permit for adjustment so as to position properly the slice deflector 14 with respect to its mounting and to the adjacent parts of the machine, the adjustment being particularly for longitudinal or vertical adjustment. The sleeve 167 has an enlarged head 168, Figs. 31 and 32, to cover fully the opening 166 regardless of the position the sleeve 167 assumes in the opening 166. The sleeve 167 is locked in its adjusted position in the opening 166 by means of two locking screws 169, which overlap the enlarged head 168 on the sleeve 167. The pin 162 has a bead-like head 170, Fig. 32, to effect frictional engagement with the sleeve 167, allowing the slice deflector to have pivotal movement of the deflector plate about the pin 162 which acts as a pivot, as well as permitting the deflector plate to be removed from the knife box with the pin 162 attached to the deflector plate. The deflector plate is provided with means to effect lateral adjustment with respect to the knife box 4 to space the deflector properly laterally with respect to the knife 5 and the adjacent parts. The means for this lateral adjustment comprises a set screw 171, Figs. 31 and 32, threadedly engaging a threaded opening in the enlargement 164 of the deflector plate. The set screw is adapted to engage the enlarged head 168 on the sleeve 167 whereby the deflector 14 is moved laterally closer to or farther away from the knife box by screwing out or screwing in, respectively, the set screw 171. The slice deflector 14 is therefore pivotally and removably mounted and is capable of various adjustments. The slice deflector may be maintained in locked position by the knife sharpener casing 15 fitting down a predetermined distance over the upper edge of the upper part 160 of the deflector body 158, Fig. 2.

Knife sharpener casing 15

The knife sharpener casing 15, Figs. 1, 2, 5 and 27, is adapted to be recessed into a part of the machine as disclosed in two copending applications of Paul H. Meyer, Serial No. 571,887, filed January 8, 1945, now Patent No. 2,486,797, and Serial No. 576,633, filed February 7, 1945, and the copending application of Adrianus van Duyn, Serial No. 682,707, filed July 10, 1946, now Patent No. 2,486,810, each assigned to the present assignee. The casing 15 is adapted to house sharpening stones of the type disclosed in application Serial No. 571,887, to sharpen the knife 5.

The sharpening casing 15 extends transversely at or near the top of the machine and includes a front flange 172, Figs. 1, 5 and 27, fitting into a cutout in the knife center plate, and a rear flange 173, Figs. 2 and 5, fitting adjacent the knife box 4 and contiguous therewith. The flange 173 may be rabbeted into the machine frame; abut with a part of the machine; or it may extend over the top of an upper edge of the slice deflector, as shown in Fig. 2. The end of the casing, adjacent the operator's stance, may be flanged as indicated at 174, Fig. 2, to overlie the part 160 of the slice deflector, as shown clearly in Fig. 2. The opposite end of the casing 15 (farthest removed from the operator) may taper and merge into the machine frame and the flange of the knife center plate, as shown in Figs. 2 and 27. The casing includes a top 175, all the parts of the casing being integral. A knob 176 is mounted on top of the casing to facilitate operation thereof, as the casing is adapted to be shifted to and from knife grinding or sharpening positions.

The knife box 4, Figs. 5, 7, 12 and 13, is adapted to be recessed to provide a chamber 177 into which the sharpening mechanism carried by the casing is housed, Fig. 7 showing a slidably and pivotally mounted rod 178 which carries the sharpener casing and the sharpening mechanism. The housing 15 is juxtaposed with respect to the knife to protect an edge of the knife during normal use of the machine and to attain sharpening position when shifted and turned 180° to sharpening position (also see Figs. 12 and 24).

Modified construction

The modified form of construction disclosed in Fig. 35 comprises a stabilizer or brace 179 to brace the upper end of the gauge plate 10, to stiffen the upper end of the gauge plate and to prevent flexing of the gauge plate when a pressure is exerted against the gauge plate, such as when a heavy piece of substance bears against the gauge plate. The brace or stabilizer 179 comprises a member or arm 180 in the form of a reverse curve, one end of which is pivotally secured to the knife box as at 181, and the other end pivotally connected to the extreme upper edge of the gauge plate at the end furthest removed from the operator as at 182. The knife sharpener casing is provided with a cutout or opening 183 through which the member 180 projects to permit the pivotal connection 181 with a part on the knife box 4. Operation of the gauge plate operating rod 123, Fig. 2, causes shifting movement of the gauge plate, and this shifting movement is not interfered with by the brace member 179 because of its double attachment. However, the member 179 prevents any sagging or deflection of the gauge plate by pressure exerted at the upper far end thereof. The use of the brace is particularly desirable in many instances, particularly in cases when a gauge plate does not have the positive non-tilting construction herein employed with the present gauge plate.

Of course the machine is properly wired to effect electrical operation, there being a switch to turn on, or shut off, the electrical current leading from a source of electrical supply.

A handle is secured to the underside of the food table 6 for manual reciprocation of the food table 6.

The invention provides a slicing machine embodying numerous features for effecting ease in operation, allowing adjustment of several of the parts, and to cause even slices to be cut. Also, the design of the machine is such that the various parts may be removed quickly and easily for effecting assembly and for repair purposes. Furthermore, the parts are so arranged and constructed as to permit the machine and parts thereof to be cleaned quickly and easily. The machine, also, accomplishes the purpose of giving full protection to the operator. The machine is efficient in operation, can be readily made and assembled, may be economically manufactured and is not likely to get out of order.

Changes may be made in the form, construction and arrangement of the parts without departing from the spirit of the invention or sacrificing any of its advantages, and the right is hereby reserved to make all such changes as fall fairly within the scope of the following claims.

The invention is hereby claimed as follows:

1. A slicing machine comprising a main frame having a motor housing formed integrally at one side and at one end thereof, one side of the housing having an inclined face provided with an opening therein, said face having a recess, an open front substantially cylindrical knife box secured detachably on said face and nesting into said recess, a bearing sleeve on the knife box, a knife shaft in said sleeve, a drive pulley in the box to drive the shaft, a circular knife carried by said shaft, a plate secured to the open face of said knife box, whereby said plate is interposed between said knife box and said knife to close the opening in the knife box, an arcuate knife edge finger guard adjacent a part of the knife edge single means for securing said plate and guard to the open front of said knife box with said circular guard overlying a peripheral portion of said plate and serving to clamp said edge to said open front of the knife box, and a knife center plate overlying the central part of said knife attached removably to said guard.

2. A slicing machine comprising a main frame, an open-fronted motor housing secured to said frame, a knife box secured removably to the open front of said housing and closing the same, a pulley in said knife box, a knife shaft supported by said knife box and connected to said pulley, a drive motor mounted within said housing to drive said pulley, a knife on the knife shaft, a knife center plate forming a cover for the entire knife except at one cutting side thereof, a flange on the plate extending about a part of the knife edge, a stud carried by the knife edge finger guard and having interengagement with the center plate at the botom thereof, and a handle member secured to said center plate remote from the stud and lockingly engaging a member carried by the knife box.

3. A slicing machine comprising a main frame, a knife operatively secured to said frame, means for operating said knife, a gauge plate support integral with the frame and having an inclined attaching face, a bracket secured to said face, a gauge plate housing slidably disposed on said bracket, a gauge plate secured to said housing, and operable means to shift the gauge plate away from the knife cutting plane and laterally away from the knife cutting edge, said operable means including a worm rotatably mounted on said frame, a worm segment gear engaging the worm, a pin on the gear, a link connected at one end to the pin, and a pin on the other end of the link passing through the bracket and fastened to the housing.

4. A slicing machine comprising a main frame, a knife operatively secured to said frame, means for operating said knife, a gauge plate support integral with the frame and having an inclined attaching face, a bracket secured to said face, a gauge plate housing, a gauge plate secured to said housing, operable means to shift the gauge plate away from the knife cutting plane and laterally away from the knife cutting edge, said operable means including a worm, a worm segment gear engaging the worm, a pin on the gear, a link connected to the pin, a pin on the link passing through the bracket and fastened to the housing, and a knob exteriorly of the frame and connected rigidly to the worm to rotate the worm to shift the gauge plate, said bracket including spaced supports engaging the housing to hold the housing in position, and adjustable means for adjusting the bracket longitudinally and laterally, and in a plane parallel to the cutting plane of the knife, said adjustable means comprising tightening screws threadedly engaging the housing and receivable in enlarged holes in the bracket.

5. A slicing machine comprising a main frame, a motor housing integral with the frame, a knife box detachably secured to a face of the motor housing, a knife operatively supported by the knife box, a sleeve mounted in an opening in the knife box, means for locking the sleeve adjustably in the knife box, a pin slidable and removable in the sleeve, a slice deflector adjacent a face of the knife and to which the pin is attached whereby the slice deflector is slidably and pivotally mounted, and means to limit the slidable movement of the slice deflector.

6. A slicing machine comprising a main frame, a motor housing integral with the frame, a knife box detachably secured to a face of the motor housing, a knife operatively supported by the knife box, a sleeve mounted in an opening in the knife box, means for locking the sleeve adjustably in the knife box, a pin slidable and removable in the sleeve, a slice deflector adjacent a face of the knife and to which the pin is attached whereby the slice deflector is slidably and pivotally mounted, means to limit the slidable movement of the slice deflector, the slice deflector having a body which is bulged centrally to fit the knife box, and upper and lower projecting surfaces extending from the centrally bulged part of the body, and a knife sharpener casing recessed in the knife box and having a part engaging the upper projecting surface of the body to hold the deflector in position.

7. A slicing machine comprising a main frame, a motor housing integral with the frame, a knife box detachably secured to a face of the motor housing, a knife operatively supported by the knife box, a knife edge finger guard removably secured to the knife box, rigid means on the guard to space the guard from the knife box in a plane coextensive with the knife plane, a removable combined knife center plate and knife guard removably supported by the knife edge finger guard, and means carried by the knife edge finger guard to adjust the position of the knife center plate.

8. In a slicing machine, an integral, substantially rectangular cast main frame provided with a continuous downwardly extending marginal flange, said frame including a flat, horizontal, substantially rectangular, slice-receiving table top encompassing an area bounded by one end of the frame and by the opposite sides thereof, a continuous marginal raised hollow rib extending around the table top at said sides and said end of the frame, a raised motor housing positioned between said table top and the other end of the frame and having an inner wall merging with said table top and an outer wall flush with said marginal flange at said latter end of the frame, said motor housing having a rear wall substantially flush with said marginal flange at the rear side of the frame, an inwardly and upwardly inclined top wall of arcuate shape in cross section merging with said inner and outer walls, and a rearwardly and upwardly inclined front wall, a portion of said inner and top walls and a portion of said front wall being discontinued to provide a forwardly and rearwardly inclined surface and an arcuate surface at right angles thereto to form a close fitting knife box support, a knife box secured to said support, and a circular knife blade mounted for rotation in said knife box about an axis substantially perpendicular to said support, a portion of said circular knife blade overlying a portion of said flat horizontal table and a vertical projection of at least one half of said knife blade lying wholly within the confines of said slice-receiving table top, said marginal raised rib and depending flange at the front of said frame constituting a slide bar housing, and a portion of said flange constituting a limit stop for an article supporting carriage.

9. In a slicing machine, an integral, substantially rectangular cast main frame provided with a continuous downwardly extending marginal flange, said frame including a flat, horizontal, substantially rectangular slice-receiving table top encompassing an area bounded by one end of the frame and by the opposite sides thereof, a continuous marginal raised hollow rib extending around the table top at said sides and said end of the frame, a raised motor housing positioned between said table top and the other end of the frame and having an inner wall merging with said table top and an outer wall flush with said marginal flange at said latter end of the frame, said motor housing having a rear wall substantially flush with said marginal flange at the rear side of the frame, an inwardly and upwardly inclined top wall of arcuate shape in cross section merging with said inner and outer walls, and a rearwardly and upwardly inclined front wall, a portion of said inner and top walls and a portion of said front wall being discontinued to provide a forwardly and rearwardly inclined surface and an arcuate surface at right angles thereto to form a close fitting knife box support, a knife box secured to said support, a circular knife blade mounted for rotation in said knife box about an axis substantially perpendicular to said support, a portion of said circular knife blade overlying a portion of said flat horizontal table and a vertical projection of at least one-half of said knife blade lying wholly within the confines of said slice-receiving table top, said marginal raised rib and marginal flange at the front of said frame constituting a slide bar housing, a portion of said flange constituting a limit stop for an article supporting carriage, and a gauge plate housing formed on said slide bar housing and projecting upwardly therefrom adjacent the end of the frame remote from said motor housing for demountably supporting a gauge plate.

10. In a slicing machine, a main frame, a motor housing integrally formed with said frame and having an open front, said housing including a side wall and a front wall, a forward portion of said side wall and an adjacent portion of said front wall being cut away to provide a recess in said housing, a generally cylindrical knife box closely fitting within said recess and closing the same, a driven pulley rotatably mounted in said knife box for rotation about an axis substantially parallel to the axis of said motor housing, a knife shaft rotatably mounted in said knife box and operatively connected to said pulley, a motor disposed in said housing and having a drive shaft extending in a direction substantially parallel to the axis of rotation of said pulley, a driving pulley on said motor shaft exteriorly of said knife box, means operatively connecting said pulleys in driving relationship, and a circular knife mounted in said knife box for rotation in unison with said driven pulley.

CORNELIS KLINGENS.
JAMES LESLIE FOSTER.

REFERENCES CITED

The following references are of record in the file of this patent:

UNITED STATES PATENTS

| Number | Name | Date |
| --- | --- | --- |
| D. 145,406 | Meyer | Mar. 24, 1945 |
| 1,716,416 | Campbell | June 11, 1929 |
| 1,742,575 | Campbell | Jan. 7, 1930 |
| 1,923,860 | Campbell | Aug. 22, 1933 |
| 1,961,959 | Campbell | June 5, 1934 |
| 1,966,088 | Campbell | July 10, 1934 |
| 2,008,822 | Frendenberg | July 23, 1935 |
| 2,043,850 | Folk | June 9, 1936 |
| 2,355,354 | Wood | Aug. 8, 1944 |

FOREIGN PATENTS

| Number | Country | Date |
| --- | --- | --- |
| 268,120 | Great Britain | Mar. 31, 1927 |

Certificate of Correction

Patent No. 2,563,120                                          August 7, 1951

CORNELIS KLINGENS ET AL.

It is hereby certified that error appears in the printed specification of the above numbered patent requiring correction as follows:

Column 5, line 6, for "susbtances" read *substances*; column 10, line 8, for "pulley 75" read *pulley 73*; column 11, line 39, for patent number "2,522,372" read *2,492,885*; column 19, line 59, for "botom" read *bottom*; column 22, list of references cited, under the heading "UNITED STATES PATENTS" add the following:

| | | |
|---|---|---|
| *D. 135,739* | Arens et al. | June 1, 1943 |
| *D. 155,292* | Klingens et al. | Sept. 20, 1949 |
| *1,945,269* | Freudenberg | Jan. 30, 1934 |
| *2,158,556* | Wesche | May 16, 1939 |
| *2,167,015* | Waage | July 25, 1939 |
| *2,177,475* | Campbell | Oct. 24, 1939 |
| *2,402,519* | Wood | June 18, 1946 |
| *2,412,962* | Brookhart et al. | Dec. 24, 1946 | and that the said Letters Patent should be read as corrected above, so that the same may conform to the record of the case in the Patent Office.

Signed and sealed this 18th day of December, A. D. 1951.

[SEAL]

THOMAS F. MURPHY,
*Assistant Commissioner of Patents.*